(12) United States Patent
Paek et al.

(10) Patent No.: US 8,370,869 B2
(45) Date of Patent: Feb. 5, 2013

(54) VIDEO DESCRIPTION SYSTEM AND METHOD

(75) Inventors: Seungyup Paek, New York, NY (US); Ana Benitez, New York, NY (US); Shih-Fu Chang, New York, NY (US); Atul Puri, Riverdale, NY (US); Qian Huang, Ashburn, VA (US); Chung-Sheng Li, Ossining, NY (US); John R. Smith, New Hyde Park, NY (US); Lawrence Bergman, Mount Kisco, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 627 days.

(21) Appl. No.: 11/448,114

(22) Filed: Jun. 6, 2006

(65) Prior Publication Data

US 2007/0245400 A1  Oct. 18, 2007

Related U.S. Application Data

(63) Continuation of application No. 09/831,218, filed on Dec. 11, 2001, now Pat. No. 7,143,434.

(60) Provisional application No. 60/118,020, filed on Feb. 1, 1999, provisional application No. 60/118,027, filed on Feb. 1, 1999, provisional application No. 60/107,463, filed on Nov. 6, 1998.

(51) Int. Cl.
*H04H 60/32* (2008.01)
*G06K 9/00* (2006.01)

(52) U.S. Cl. ............................ 725/19; 382/162; 382/165

(58) Field of Classification Search ................ 715/500.1
See application file for complete search history.

(56) References Cited

U.S. PATENT DOCUMENTS

| | | | |
|---|---|---|---|
| 4,649,380 | A | 3/1987 | Penna |
| 4,712,248 | A | 12/1987 | Hongo |
| 5,144,685 | A | 9/1992 | Nasar et al. |
| 5,191,645 | A | 3/1993 | Carlucci et al. |
| 5,204,706 | A | 4/1993 | Saito |
| 5,208,857 | A | 5/1993 | Lebrat |
| 5,262,856 | A | 11/1993 | Lippman et al. |

(Continued)

FOREIGN PATENT DOCUMENTS

| EP | 0579319 | 1/1994 |
|---|---|---|
| EP | 0587329 | 3/1994 |

(Continued)

OTHER PUBLICATIONS

MPEG-7 Requirements; Oct. 1998.*

(Continued)

*Primary Examiner* — Justin Shepard
(74) *Attorney, Agent, or Firm* — Baker Botts LLP

(57) ABSTRACT

Systems and methods for describing video content establish video description records which include an object set (24), an object hierarchy (26) and entity relation graphs (28). Video objects can include global objects, segment objects and local objects. The video objects are further defined by a number of features organized in classes, which in turn are further defined by a number of feature descriptors (36, 38, and 40). The relationships (44) between and among the objects in the object set (24) are defined by the object hierarchy (26) and entity relation graphs (28). The video description records provide a standard vehicle for describing the content and context of video information for subsequent access and processing by computer applications such as search engines, filters and archive systems.

23 Claims, 12 Drawing Sheets

U.S. PATENT DOCUMENTS

| | | | |
|---|---|---|---|
| 5,408,274 A | 4/1995 | Chang et al. | |
| 5,428,774 A | 6/1995 | Takahashi et al. | |
| 5,461,679 A | 10/1995 | Normile et al. | |
| 5,465,353 A | 11/1995 | Hull et al. | |
| 5,488,664 A | 1/1996 | Shamir | |
| 5,493,677 A | 2/1996 | Balogh et al. | |
| 5,530,759 A | 6/1996 | Braudaway et al. | |
| 5,546,571 A | 8/1996 | Shan et al. | |
| 5,546,572 A | 8/1996 | Seto et al. | |
| 5,555,354 A | 9/1996 | Strasnick et al. | |
| 5,555,378 A | 9/1996 | Gelman et al. | |
| 5,557,728 A | 9/1996 | Garrett et al. | |
| 5,566,089 A | 10/1996 | Hoogenboom | |
| 5,572,260 A | 11/1996 | Onishi et al. | |
| 5,579,444 A | 11/1996 | Dalziel et al. | |
| 5,579,471 A | 11/1996 | Barber et al. | |
| 5,606,655 A | 2/1997 | Arman et al. | |
| 5,613,032 A | 3/1997 | Cruz et al. | |
| 5,615,112 A | 3/1997 | Liu Sheng et al. | |
| 5,617,119 A | 4/1997 | Briggs et al. | |
| 5,623,690 A | 4/1997 | Palmer et al. | |
| 5,630,121 A | 5/1997 | Braden-Harder et al. | |
| 5,642,477 A | 6/1997 | de Carmo et al. | |
| 5,655,117 A | 8/1997 | Goldberg et al. | |
| 5,664,018 A | 9/1997 | Leighton | |
| 5,664,177 A | 9/1997 | Lowry | |
| 5,668,897 A | 9/1997 | Stolfo | |
| 5,684,715 A * | 11/1997 | Palmer | 348/473 |
| 5,694,334 A | 12/1997 | Donahue et al. | |
| 5,694,945 A | 12/1997 | Ben-Haim | |
| 5,696,964 A | 12/1997 | Cox et al. | |
| 5,701,510 A | 12/1997 | Johnson et al. | |
| 5,708,805 A | 1/1998 | Okamoto et al. | |
| 5,713,021 A | 1/1998 | Kondo et al. | |
| 5,721,815 A | 2/1998 | Ottesen et al. | |
| 5,724,484 A | 3/1998 | Kagami et al. | |
| 5,734,752 A | 3/1998 | Knox | |
| 5,734,893 A | 3/1998 | Li et al. | |
| 5,742,283 A | 4/1998 | Kim | |
| 5,751,286 A | 5/1998 | Barber et al. | |
| 5,758,076 A | 5/1998 | Wu et al. | |
| 5,767,922 A | 6/1998 | Zabih et al. | |
| 5,768,578 A | 6/1998 | Kirk et al. | |
| 5,790,703 A | 8/1998 | Wang | |
| 5,794,178 A | 8/1998 | Caid et al. | |
| 5,794,242 A | 8/1998 | Green et al. | |
| 5,802,361 A | 9/1998 | Wang et al. | |
| 5,805,733 A | 9/1998 | Wang et al. | |
| 5,805,804 A | 9/1998 | Laursen et al. | |
| 5,809,139 A | 9/1998 | Girod et al. | |
| 5,809,160 A | 9/1998 | Powell et al. | |
| 5,821,945 A | 10/1998 | Yeo et al. | |
| 5,822,524 A | 10/1998 | Chen et al. | |
| 5,825,892 A | 10/1998 | Braudaway et al. | |
| 5,848,155 A | 12/1998 | Cox | |
| 5,852,435 A | 12/1998 | Vigneaux et al. | |
| 5,852,823 A | 12/1998 | De Bonet | |
| 5,870,754 A | 2/1999 | Dimitrova et al. | |
| 5,873,080 A | 2/1999 | Coden et al. | |
| 5,884,298 A | 3/1999 | Smith et al. | |
| 5,887,061 A | 3/1999 | Sato | |
| 5,893,095 A | 4/1999 | Jain et al. | |
| 5,915,027 A | 6/1999 | Cox et al. | |
| 5,930,783 A | 7/1999 | Li et al. | |
| 5,937,422 A | 8/1999 | Nelson et al. | |
| 5,943,422 A | 8/1999 | Van Wie et al. | |
| 5,949,885 A | 9/1999 | Leighton | |
| 5,960,081 A | 9/1999 | Vynne et al. | |
| 5,963,203 A | 10/1999 | Goldberg et al. | |
| 5,969,755 A | 10/1999 | Courtney | |
| 5,983,218 A | 11/1999 | Syeda-Mahmood | |
| 5,987,459 A | 11/1999 | Swanson et al. | |
| 5,995,095 A | 11/1999 | Ratakonda | |
| 5,995,978 A | 11/1999 | Cullen et al. | |
| 6,031,914 A | 2/2000 | Tewfik et al. | |
| 6,037,984 A | 3/2000 | Isanardi et al. | |
| 6,041,079 A | 3/2000 | Yim | |
| 6,047,374 A | 4/2000 | Barton | |
| 6,058,186 A | 5/2000 | Enari | |
| 6,058,205 A | 5/2000 | Bahl et al. | |
| 6,064,764 A | 5/2000 | Bhaskaran et al. | |
| 6,070,167 A * | 5/2000 | Qian et al. | 1/1 |
| 6,070,228 A | 5/2000 | Belknap et al. | |
| 6,072,542 A | 6/2000 | Wilcox et al. | |
| 6,075,875 A | 6/2000 | Gu | |
| 6,078,664 A | 6/2000 | Moskowitz et al. | |
| 6,079,566 A | 6/2000 | Eleftheriadis et al. | |
| 6,081,278 A | 6/2000 | Chen | |
| 6,092,072 A | 7/2000 | Guha et al. | |
| 6,100,930 A | 8/2000 | Kolczynski | |
| 6,104,411 A | 8/2000 | Ito et al. | |
| 6,108,434 A | 8/2000 | Cox et al. | |
| 6,115,717 A | 9/2000 | Mehrotra et al. | |
| 6,122,403 A | 9/2000 | Rhoads | |
| 6,125,229 A | 9/2000 | Dimitrova et al. | |
| 6,154,755 A | 11/2000 | Dellert et al. | |
| 6,157,746 A | 12/2000 | Sodagar et al. | |
| 6,172,675 B1 | 1/2001 | Ahmad et al. | |
| 6,178,416 B1 | 1/2001 | Thompson et al. | |
| 6,185,329 B1 | 2/2001 | Zhang et al. | |
| 6,195,458 B1 | 2/2001 | Warnick et al. | |
| 6,208,735 B1 | 3/2001 | Cox et al. | |
| 6,208,745 B1 | 3/2001 | Florencio et al. | |
| 6,222,932 B1 | 4/2001 | Rao et al. | |
| 6,223,183 B1 | 4/2001 | Smith et al. | |
| 6,236,395 B1 | 5/2001 | Sezan et al. | |
| 6,240,424 B1 | 5/2001 | Hirata | |
| 6,243,419 B1 | 6/2001 | Satou et al. | |
| 6,246,804 B1 | 6/2001 | Sato et al. | |
| 6,252,975 B1 | 6/2001 | Bozdagi et al. | |
| 6,269,358 B1 | 7/2001 | Hirata | |
| 6,275,599 B1 | 8/2001 | Adler et al. | |
| 6,282,299 B1 | 8/2001 | Tewfik et al. | |
| 6,282,300 B1 | 8/2001 | Bloom et al. | |
| 6,285,995 B1 | 9/2001 | Abdel-Mottaleb et al. | |
| 6,297,797 B1 | 10/2001 | Takeuchi et al. | |
| 6,327,390 B1 | 12/2001 | Sun et al. | |
| 6,332,030 B1 | 12/2001 | Manjunath et al. | |
| 6,339,450 B1 | 1/2002 | Chang et al. | |
| 6,356,309 B1 | 3/2002 | Masaki et al. | |
| 6,360,234 B2 | 3/2002 | Jain et al. | |
| 6,366,314 B1 | 4/2002 | Goudezeune et al. | |
| 6,366,701 B1 | 4/2002 | Chalom et al. | |
| 6,385,329 B1 | 5/2002 | Sharma et al. | |
| 6,385,602 B1 | 5/2002 | Tso et al. | |
| 6,393,394 B1 | 5/2002 | Ananthapadmanabhan et al. | |
| 6,404,925 B1 | 6/2002 | Foote et al. | |
| 6,418,232 B1 | 7/2002 | Nakano et al. | |
| 6,418,421 B1 | 7/2002 | Hurtado et al. | |
| 6,442,538 B1 | 8/2002 | Nojima | |
| 6,453,053 B1 | 9/2002 | Wakasu | |
| 6,466,940 B1 * | 10/2002 | Mills | 707/102 |
| 6,473,459 B1 | 10/2002 | Sugano et al. | |
| 6,476,814 B1 * | 11/2002 | Garvey | 345/440 |
| 6,487,301 B1 | 11/2002 | Zhao | |
| 6,499,105 B1 | 12/2002 | Yoshiura et al. | |
| 6,526,099 B1 | 2/2003 | Christopoulos et al. | |
| 6,532,541 B1 | 3/2003 | Chang et al. | |
| 6,546,135 B1 | 4/2003 | Lin et al. | |
| 6,549,911 B2 | 4/2003 | Gustman | |
| 6,556,695 B1 | 4/2003 | Packer et al. | |
| 6,556,958 B1 | 4/2003 | Chickering | |
| 6,560,284 B1 | 5/2003 | Girod et al. | |
| 6,567,805 B1 | 5/2003 | Johnson et al. | |
| 6,581,058 B1 | 6/2003 | Fayyad et al. | |
| 6,606,329 B1 | 8/2003 | Herrmann | |
| 6,606,393 B1 | 8/2003 | Xie et al. | |
| 6,628,824 B1 | 9/2003 | Belanger | |
| 6,643,387 B1 | 11/2003 | Sethuraman et al. | |
| 6,654,931 B1 | 11/2003 | Haskell et al. | |
| 6,678,389 B1 | 1/2004 | Sun et al. | |
| 6,683,966 B1 | 1/2004 | Tian et al. | |
| 6,700,935 B2 | 3/2004 | Lee | |
| 6,701,309 B1 | 3/2004 | Beeferman et al. | |
| 6,708,055 B2 | 3/2004 | Geiser et al. | |
| 6,714,909 B1 | 3/2004 | Gibbon et al. | |
| 6,716,175 B2 | 4/2004 | Geiser et al. | |

| | | |
|---|---|---|
| 6,718,047 B2 | 4/2004 | Rhoads |
| 6,721,733 B2 | 4/2004 | Lipson et al. |
| 6,725,372 B1 | 4/2004 | Lewis et al. |
| 6,735,253 B1 | 5/2004 | Chang et al. |
| 6,757,407 B2 | 6/2004 | Bruckstein et al. |
| 6,778,223 B2 | 8/2004 | Abe |
| 6,792,434 B2 | 9/2004 | Moghaddam et al. |
| 6,807,231 B1 | 10/2004 | Wiegand et al. |
| 6,816,836 B2 | 11/2004 | Basu et al. |
| 6,847,980 B1 | 1/2005 | Benitez et al. |
| 6,886,013 B1 | 4/2005 | Beranek |
| 6,940,910 B2 | 9/2005 | Jun et al. |
| 6,950,542 B2 | 9/2005 | Roesch et al. |
| 6,970,602 B1 | 11/2005 | Smith et al. |
| 7,010,751 B2 | 3/2006 | Shneiderman |
| 7,072,398 B2 | 7/2006 | Ma |
| 7,103,225 B2 | 9/2006 | Yang et al. |
| 7,143,434 B1 | 11/2006 | Paek et al. |
| 7,145,946 B2 | 12/2006 | Lee |
| 7,184,959 B2 | 2/2007 | Gibbon et al. |
| 7,185,049 B1 | 2/2007 | Benitez et al. |
| 7,254,285 B1 | 8/2007 | Paek et al. |
| 7,308,443 B1 | 12/2007 | Lee et al. |
| 7,313,269 B2 | 12/2007 | Xie et al. |
| 7,327,885 B2 | 2/2008 | Divakaran et al. |
| 7,339,992 B2 | 3/2008 | Chang et al. |
| 7,386,806 B2 | 6/2008 | Wroblewski |
| 7,398,275 B2 | 7/2008 | Rising et al. |
| 7,403,302 B2 | 7/2008 | Gann |
| 7,406,409 B2 | 7/2008 | Otsuka et al. |
| 7,409,144 B2 | 8/2008 | McGrath et al. |
| 7,437,004 B2 | 10/2008 | Baatz et al. |
| 7,496,830 B2 | 2/2009 | Rubin et al. |
| 7,519,217 B2 | 4/2009 | Liu et al. |
| 7,624,337 B2 | 11/2009 | Sull et al. |
| 7,636,662 B2 | 12/2009 | Dimtrva et al. |
| 7,676,820 B2 | 3/2010 | Snijder et al. |
| 7,720,851 B2 | 5/2010 | Chang et al. |
| 7,733,956 B1 | 6/2010 | Kalra et al. |
| 7,738,550 B2 | 6/2010 | Kuhn |
| 7,756,338 B2 | 7/2010 | Wilson et al. |
| 7,773,813 B2 | 8/2010 | Hua et al. |
| 7,809,192 B2 | 10/2010 | Gokturk et al. |
| 7,817,855 B2 | 10/2010 | Yuille et al. |
| 7,996,762 B2 | 8/2011 | Qi et al. |
| 8,010,296 B2 | 8/2011 | Loo et al. |
| 8,135,221 B2 | 3/2012 | Jiang et al. |
| 8,218,617 B2 | 7/2012 | Kim et al. |
| 2001/0000962 A1 | 5/2001 | Rajan |
| 2002/0021828 A1 | 2/2002 | Papier et al. |
| 2002/0118748 A1 | 8/2002 | Inomata et al. |
| 2002/0157116 A1 | 10/2002 | Jasinschi |
| 2002/0169771 A1 | 11/2002 | Melmon et al. |
| 2003/0013951 A1 | 1/2003 | Stefanescu et al. |
| 2003/0046018 A1 | 3/2003 | Kohlmorgen et al. |
| 2003/0195883 A1 | 10/2003 | Mojsilovic et al. |
| 2003/0229278 A1 | 12/2003 | Sinha |
| 2004/0057081 A1 | 3/2004 | Kubota |
| 2004/0131121 A1 | 7/2004 | Dumitras et al. |
| 2004/0210819 A1 | 10/2004 | Alonso |
| 2005/0076055 A1 | 4/2005 | Mory et al. |
| 2005/0174790 A1 | 8/2005 | Suzuki et al. |
| 2005/0201619 A1 | 9/2005 | Sun et al. |
| 2005/0210043 A1 | 9/2005 | Manasse |
| 2005/0238238 A1 | 10/2005 | Xu et al. |
| 2006/0026588 A1 | 2/2006 | Illowsky et al. |
| 2006/0167784 A1 | 7/2006 | Hoffberg |
| 2006/0200260 A1 | 9/2006 | Hoffberg et al. |
| 2006/0206882 A1 | 9/2006 | Illowsky et al. |
| 2006/0258419 A1 | 11/2006 | Winkler et al. |
| 2006/0293921 A1 | 12/2006 | McCarthy et al. |
| 2007/0033170 A1 | 2/2007 | Sull et al. |
| 2007/0038612 A1 | 2/2007 | Sull et al. |
| 2007/0044010 A1 | 2/2007 | Sull et al. |
| 2007/0078846 A1 | 4/2007 | Gulli et al. |
| 2007/0087756 A1 | 4/2007 | Hoffberg |
| 2007/0174790 A1 | 7/2007 | Jing et al. |
| 2007/0195106 A1 | 8/2007 | Lin et al. |
| 2007/0237426 A1 | 10/2007 | Xie et al. |
| 2008/0055479 A1 | 3/2008 | Shehata et al. |
| 2008/0097939 A1 | 4/2008 | Guyon et al. |
| 2008/0181308 A1 | 7/2008 | Wang et al. |
| 2008/0193016 A1 | 8/2008 | Lim et al. |
| 2008/0222670 A1 | 9/2008 | Lee et al. |
| 2008/0266300 A1 | 10/2008 | Deering et al. |
| 2008/0298464 A1 | 12/2008 | Hinz et al. |
| 2008/0303942 A1 | 12/2008 | Chang et al. |
| 2009/0055094 A1 | 2/2009 | Suzuki |
| 2009/0290635 A1 | 11/2009 | Kim et al. |
| 2009/0316778 A1 | 12/2009 | Kim et al. |
| 2010/0172591 A1 | 7/2010 | Ishikawa |
| 2011/0025710 A1 | 2/2011 | Kennedy et al. |
| 2011/0064136 A1 | 3/2011 | Chang et al. |
| 2011/0093492 A1 | 4/2011 | Sull et al. |
| 2011/0145232 A1 | 6/2011 | Chang et al. |
| 2011/0255605 A1 | 10/2011 | Chang et al. |
| 2011/0314367 A1 | 12/2011 | Chang et al. |

FOREIGN PATENT DOCUMENTS

| | | |
|---|---|---|
| EP | 0953938 | 11/1999 |
| JP | 2004049471 | 2/1992 |
| JP | 1996317384 | 11/1996 |
| WO | WO98/33323 | 7/1998 |
| WO | WO00/28440 | 5/2000 |
| WO | WO00/49797 | 8/2000 |

OTHER PUBLICATIONS

MPEG-7 Context and Objectives; Oct. 1998.*
MPEG-7 Proposal Package Description; Oct. 1998.*
Oomoto E et al: "OVID: design and implementation of a video-object database system" IEEE Transactions on Knowledge and Data Engineering, IEEE, Inc. New York, US, vol. 5, No. 4, Aug. 1993, pp. 629-643, XP002134326 ISSN: 1041-4347.
Chung-Sheng Li et al: "Multimedia content descriptioin in the InfoPyramid" Acoustics, Speech and Signal Processing, 1998. Porceedings of the 1998 IEEE International Conference on Seattle, WA, USA May 12-15, 1998, New York, NY USA, IEEE, US, May 12, 1998, pp. 3789-3792, XP010279595 ISBN: 0-7803-4428-6.
Bayram et al.: "Image Manipulation Detection,", Journal of Electronic Imaging 15(4), 041102, (Oct.-Dec. 2006).
Fridich et al.: "Detection of Copy-Move Forgery in Digital Images", *Proc. of DFRWS 2003*, Cleveland, OH, USA, Aug. 5-8, 2003.
U.S. Appl. No. 10/482,074, filed Dec. 24, 2003, (Abandoned).
U.S. Appl. No. 13/165,553, filed Jun. 21, 2011.
U.S. Appl. No. 13/078,626, filed Apr. 4, 2011.
U.S. Appl. No. 09/423,770, filed Nov. 12, 1999, (Abandoned).
U.S. Appl. No. 10/333,030, filed Jun. 6, 2003, (Abandoned).
U.S. Appl. No. 09/423,409, filed Nov. 4, 1999.
U.S. Appl. No. 09/623,277, filed Sep. 1, 2000, (Abandoned).
U.S. Appl. No. 09/607,974, filed Jun. 30, 2000.
U.S. Appl. No. 09/530,308, filed Sep. 5, 2000.
U.S. Appl. No. 10/220,776, filed Jan. 10, 2002.
U.S. Appl. No. 10/149,685, filed Jun. 13, 2002, (Abandoned).
U.S. Appl. No. 09/889,859, filed Jan. 8, 2002.
U.S. Appl. No. 09/359,836, filed Jul. 23, 1999, (Abandoned).
U.S. Appl. No. 09/830,899, filed Aug. 13, 2001.
U.S. Appl. No. 10/491,460, filed Apr. 1, 2004, (Abandoned).
U.S. Appl. No. 10/728,345, filed Dec. 4, 2003.
U.S. Appl. No. 11/506,060, filed Aug. 16, 2006, (Abandoned).
U.S. Appl. No. 10/482,074, filed Jun. 18, 2008 Notice of Abandonment.
U.S. Appl. No. 10/482,074, filed Nov. 14, 2007 Non-Final Office Action.
U.S. Appl. No. 10/965,040, filed Aug. 10, 2011 Advisory Action.
U.S. Appl. No. 10/965,040, filed Aug. 2, 2011 Response to Final Office Action.
U.S. Appl. No. 10/965,040, filed May 13, 2011 Final Office Action.
U.S. Appl. No. 10/965,040, filed Feb. 25, 2011 Response to Non-Final Office Action.
U.S. Appl. No. 10/965,040, filed Oct. 29, 2010 Non-Final Office Action.
U.S. Appl. No. 09/423,770, filed Feb. 20, 2004 Notice of Abandonment.

U.S. Appl. No. 09/423,770, filed Jul. 2, 2003 Non-Final Office Action.
U.S. Appl. No. 10/333,030, filed Jun. 25, 2010 Notice of Abandonment.
U.S. Appl. No. 10/333,030, filed Sep. 22, 2009 Non-Final Office Action.
U.S. Appl. No. 10/333,030, filed Jul. 9, 2009 Amendment and Request for Continued Examination (RCE).
U.S. Appl. No. 10/333,030, filed Feb. 26, 2009 Final Office Action.
U.S. Appl. No. 10/333,030, filed Nov. 21, 2008 Response to Non-Final Office Action.
U.S. Appl. No. 10/333,030, filed May 22, 2008 Non-Final Office Action.
U.S. Appl. No. 10/333,030, filed Apr. 15, 2008 Supplemental Response to Notice of Non-Compliant.
U.S. Appl. No. 10/333,030, filed Apr. 10, 2008 Response to Notice of Non-Compliant.
U.S. Appl. No. 10/333,030, filed Feb. 15, 2008 Notice of Non-Compliant.
U.S. Appl. No. 10/333,030, filed Jan. 24, 2008 Amendment and Request for Continued Examination (RCE).
U.S. Appl. No. 10/333,030, filed Oct. 25, 2007 Final Office Action.
U.S. Appl. No. 10/333,030, filed Aug. 28, 2007 Response to Non-Final Office Action.
U.S. Appl. No. 10/333,030, filed Apr. 30, 2007 Non-Final Office Action.
U.S. Appl. No. 10/333,030, filed Mar. 20, 2007 Response to Non-Final Office Action.
U.S. Appl. No. 10/333,030, filed Dec. 20, 2006 Non-Final Office Action.
U.S. Appl. No. 09/423,409, filed Nov. 21, 2003 Notice of Allowance.
U.S. Appl. No. 09/423,409, filed Nov. 6, 2003 Response to Final Office Action.
U.S. Appl. No. 09/423,409, filed Aug. 7, 2003 Final Office Action.
U.S. Appl. No. 09/423,409, filed Jun. 2, 2003 Response to Non-Final Office Action.
U.S. Appl. No. 09/423,409, filed Dec. 10, 2002 Non-Final Office Action.
U.S. Appl. No. 09/623,277, filed Mar. 23, 2006 Notice of Abandonment.
U.S. Appl. No. 09/623,277, filed Aug. 10, 2005 Restriction Requirement.
U.S. Appl. No. 09/607,974, filed Jul. 9, 2004 Notice of Allowance.
U.S. Appl. No. 09/607,974, filed Apr. 26, 2004 Response to Non-Final Office Action.
U.S. Appl. No. 09/607,974, filed Dec. 11, 2003 Non-Final Office Action.
U.S. Appl. No. 09/607,974, filed Nov. 10, 2003 Request for Continued Examination (RCE).
U.S. Appl. No. 09/607,974, filed Sep. 3, 2003 Advisory Action.
U.S. Appl. No. 09/607,974, filed Jul. 30, 2003 Response to Final Office Action.
U.S. Appl. No. 09/607,974, filed May 9, 2003 Final Office Action.
U.S. Appl. No. 09/607,974, filed Apr. 4, 2003 Response to Notice of Informality or Non-Responsive Amendment.
U.S. Appl. No. 09/607,974, filed Feb. 24, 2003 Notice of Informal or Non-Responsive Amendment.
U.S. Appl. No. 09/607,974, filed Jan. 8, 2003 Response to Non-Final Office Action.
U.S. Appl. No. 09/607,974, filed Jul. 1, 2002 Non-Final Office Action.
U.S. Appl. No. 09/530,308, filed Apr. 20, 2006 Notice of Allowance.
U.S. Appl. No. 09/530,308, filed Jan. 23, 2006 Response to Non-Final Office Action.
U.S. Appl. No. 09/530,308, filed Oct. 20, 2005 Non-Final Office Action.
U.S. Appl. No. 09/530,308, filed Jul. 11, 2005 Filed Appeal Brief.
U.S. Appl. No. 09/530,308, filed May 12, 2005 Filed Notice of Appeal.
U.S. Appl. No. 09/530,308, filed Feb. 9, 2005 Final Office Action.
U.S. Appl. No. 09/530,308, filed Sep. 27, 2004 Response to Non-Final Office Action.
U.S. Appl. No. 09/530,308, filed Mar. 24, 2004 Non-Final Office Action.
U.S. Appl. No. 09/530,308, filed Jan. 12, 2004 Response to Non-Final Office Action.
U.S. Appl. No. 09/530,308, filed Oct. 2, 2003 Non-Final Office Action.
U.S. Appl. No. 09/530,308, filed Jul. 14, 2003 Response to Non-Final Office Action.
U.S. Appl. No. 09/530,308, filed Nov. 20, 2002 Non-Final Office Action.
U.S. Appl. No. 10/220,776, filed Aug. 23, 2004 Notice of Allowance.
U.S. Appl. No. 10/149,685, filed Feb. 7, 2008 Notice of Abandonment.
U.S. Appl. No. 10/149,685, filed Jul. 31, 2007 Non-Final Office Action.
U.S. Appl. No. 10/149,685, filed May 7, 2007 Response to Non-Final Office Action.
U.S. Appl. No. 10/149,685, filed Feb. 6, 2007 Non-Final Office Action.
U.S. Appl. No. 09/889,859, filed Mar. 22, 2004 Notice of Allowance.
U.S. Appl. No. 09/889,859, filed Jan. 12, 2004 Response to Non-Final Office Action.
U.S. Appl. No. 09/889,859, filed Sep. 10, 2003 Non-Final Office Action.
U.S. Appl. No. 09/359,836, filed Mar. 17, 2008 Notice of Abandonment.
U.S. Appl. No. 09/359,836, filed Aug. 10, 2007 Final Office Action.
U.S. Appl. No. 09/359,836, filed May 11, 2007 Response to Non-Final Office Action.
U.S. Appl. No. 09/359,836, filed Dec. 15, 2006 Non-Final Office Action.
U.S. Appl. No. 09/359,836, filed Sep. 21, 2006 Amendment and Request for Continued Examination (RCE).
U.S. Appl. No. 09/359,836, filed May 18, 2004 Final Office Action.
U.S. Appl. No. 09/359,836, filed Mar. 5, 2004 Response to Non-Final Office Action.
U.S. Appl. No. 09/359,836, filed Aug. 29, 2003 Non-Final Office Action.
U.S. Appl. No. 09/830,899, filed Nov. 4, 2009 Notice of Allowance.
U.S. Appl. No. 09/830,899, filed Oct. 1, 2009 Request for Continued Examination (RCE).
U.S. Appl. No. 09/830,899, filed Sep. 4, 2009 Notice of Allowance.
U.S. Appl. No. 09/830,899, filed Jun. 29, 2009 Response to Non-Final Office Action.
U.S. Appl. No. 09/830,899, filed Feb. 2, 2009 Non-Final Office Action.
U.S. Appl. No. 09/830,899, filed Dec. 22, 2008 Response to Non-Final Office Action.
U.S. Appl. No. 09/830,899, filed Oct. 9, 2008 Non-Final Office Action.
U.S. Appl. No. 09/830,899, filed Jul. 15, 2008 Amendment and Request for Continued Examination.
U.S. Appl. No. 09/830,899, filed May 16, 2007 Filed Reply Brief.
U.S. Appl. No. 09/830,899, filed Apr. 5, 2007 Examiner's Answer to Appeal Brief.
U.S. Appl. No. 09/830,899, filed Dec. 18, 2006 Filed Appeal Brief.
U.S. Appl. No. 09/830,899, filed Nov. 3, 2006 Filed Notice of Appeal.
U.S. Appl. No. 09/830,899, filed Jul. 3, 2006 Final Office Action and Examiner Interview Summary.
U.S. Appl. No. 09/830,899, filed Apr. 13, 2006 Non-Final Office Action.
U.S. Appl. No. 09/830,899, filed Mar. 3, 2006 Filed Appeal Brief.
U.S. Appl. No. 09/830,899, filed Feb. 15, 2006 Notice of Defective Appeal Brief.
U.S. Appl. No. 09/830,899, filed Dec. 19, 2005 Filed Appeal Brief.
U.S. Appl. No. 09/830,899, filed Nov. 9, 2005 Pre-Appeal Brief Conference Decision.
U.S. Appl. No. 09/830,899, filed Oct. 17, 2005 Amendment, Notice of Appeal and Pre-Appeal Brief Request.
U.S. Appl. No. 09/830,899, filed Jul. 5, 2005 Final Office Action.
U.S. Appl. No. 09/830,899, filed Dec. 27, 2004 Response to Notice of Non-Compliant.

U.S. Appl. No. 09/830,899, filed Dec. 7, 2004 Notice of Non-Compliant.
U.S. Appl. No. 09/830,899, filed Jul. 6, 2004 Amendment and Request for Continued Examination (RCE).
U.S. Appl. No. 09/830,899, filed Mar. 12, 2004 Final Office Action.
U.S. Appl. No. 09/830,899, filed Dec. 11, 2003 Response to Non-Final Office Action.
U.S. Appl. No. 09/830,899, filed Aug. 13, 2003 Non-Final Office Action.
U.S. Appl. No. 10/491,460, filed Jul. 11, 2006 Notice of Abandonment.
U.S. Appl. No. 10/728,345, filed Jun. 15, 2010 Notice of Allowance.
U.S. Appl. No. 10/728,345, filed Mar. 10, 2010 Response to Non-Final Office Action.
U.S. Appl. No. 10/728,345, filed Dec. 24, 2009 Non-Final Office Action.
U.S. Appl. No. 10/728,345, filed Oct. 5, 2009 Amendment and Request for Continued Examination (RCE).
U.S. Appl. No. 10/728,345, filed Jul. 9, 2009 Final Office Action.
U.S. Appl. No. 10/728,345, filed Apr. 9, 2009 Response to Non-Final Office Action.
U.S. Appl. No. 10/728,345, filed Dec. 10, 2008 Non-Final Office Action.
U.S. Appl. No. 10/728,345, filed Sep. 30, 2008 Response to Non-Final Office Action.
U.S. Appl. No. 10/728,345, filed Jun. 30, 2008 Non-Final Office Action.
U.S. Appl. No. 10/494,739, filed Oct. 10, 2007 Notice of Allowance.
U.S. Appl. No. 09/831,215, filed Sep. 6, 2006 Notice of Allowance.
U.S. Appl. No. 09/235,862, filed Oct. 25, 2002 Notice of Allowance.
U.S. Appl. No. 09/235,862, filed Oct. 21, 2002 Supplemental Response to Final Office Action.
U.S. Appl. No. 09/235,862, filed Oct. 10, 2002 Advisory Action.
U.S. Appl. No. 09/235,862, filed Sep. 30, 2002 Response to Final Office Action.
U.S. Appl. No. 09/235,862, filed Apr. 22, 2002 Final Office Action.
U.S. Appl. No. 09/235,862, filed Mar. 12, 2002 Response to Non-Final Office Action.
U.S. Appl. No. 09/235,862, filed Nov. 7, 2001 Non-Final Office Action.
U.S. Appl. No. 09/831,218, filed Mar. 1, 2006 Notice of Allowance.
U.S. Appl. No. 09/831,218, filed Feb. 10, 2006 Response to Final Office Action.
U.S. Appl. No. 09/831,218, filed Dec. 29, 2005 Final Office Action.
U.S. Appl. No. 09/831,218, filed Nov. 28, 2005 Response to Non-Final Office Action.
U.S. Appl. No. 09/831,218, filed Aug. 24, 2005 Non-Final Office Action.
U.S. Appl. No. 11/506,060, filed May 10, 2011 Final Office Action.
U.S. Appl. No. 11/506,060, filed Apr. 12, 2011 Response to Non-Final Office Action.
U.S. Appl. No. 11/506,060, filed Oct. 19, 2010 Non-Final Office Action.
U.S. Appl. No. 11/506,060, filed Mar. 3, 2010 Amendment and Request for Continued Examination (RCE).
U.S. Appl. No. 11/506,060, filed Nov. 18, 2009 Final Office Action.
U.S. Appl. No. 11/506,060, filed Aug. 13, 2009 Response to Non-Final Office Action.
U.S. Appl. No. 11/506,060, filed Mar. 11, 2009 Non-Final Office Action.
Infotouch: An Explorative Multi-Touch Interface for Tagged Photo Collections. Linkoping University. Purportedly posted to Youtube on May 31, 2007 (http://www.youtube.com/watch?v=DHMJJwouq51). p. 1.
Zavesky et al., "Low-Latency Query Formulation and Result Exploration for Concept-Based Visual Search,", ACM Multimedia Information Retrieval Conference, Oct. 2008, Vancouver, Canada; pp. 1-23.
Dimitrova et al., "Motion Recovery for Video Contect Classification,", Arizona State University, Temple; Transactions on Information Systems; Oct. 13, 1995; No. 4, pp. 408-439; New York, NY, U.S.A.
Chang et al., "Multimedia Search and Retrieval", Published as a chapter in Advances in Multimedia: System, Standard, and Networks, A. Puri and T. Chen (eds.). New York: Marcel Dekker, 1999; pp. 559-584.
M. Bierling, "Displacement Estimation by Hierarchical Block Matching", SPIE Visual Commun. & Image Processing (1988) vol. 1001; pp. 942-951.
Hirata et al., "Query by Visual Example, Content Based Image Retrieval, Advances in Database Technology—EDBT"; Lecture Notes in Computer Science (1992, A. Pirotte et al. eds.)vol. 580; pp. 56-71.
T. Minka, "An Image Database Browed that Learns from User Interaction" MIT Media Laboratory Perceptual Computing Section, TR#365 (1996); pp. 1-55.
W. Niblack et al. "The QBIC Project: Querying Images by Content Using Color, Texture and Shape" in Storage and Retrieval for Image and Video Databases, Wayne Niblack, Editor, Proc. SPIE 1908, pp. 173-181 (1993).
Saber et al., "Region-based shape matching for automatic image annotation and query-by-example" 8 Visual Comm. and Image Representation (1997) pp. 1-40.
Sun, et al., "Architectures for MPEG Compressed Bitstream Scaling." Transactions on Circuits and Systems for Video Technology, vol. 6(2), Apr. 1996.
Sato et al., "Video OCR: Indexing digital news libraries by recognition of superimposed captions", Multimedia Systems, 7:385-394, 1999.
Trier et al.m "Feature extraction methods for character recognition-A survey", Pattern Recognition, vol. 29, pp. 641-662, 1996.
Tse et al., "Global Zoom/Pan estimation and compensation for video compression" Proceedings of ICASSP 1991, pp. 2725-2728.
Zhong et al., "Structure analysis of sports video using domain models", IEEE International Conference on Multimedia and Expo., Aug. 22-25, 2001, Tokyo, Japan.
Akutsu et al., "Video indexing using motion vectors", SPIE Visual communications and Image Processing 1992, vol. 1818, pp. 1522-1530.
Arman et al., "Image processing on compressed data for large video databases", Proceedings of ACM Multimedia '93, Jun. 1993, pp. 267-272.
Smoliar et al., "Content-Based video indexing and Retrieval", IEEE Mulitmedia, Summer 1994, pp. 62-72.
Sawhney et al., "Model-Based 2D & 3D Dominant Motion Estimation of Mosaicking and Video Representation" Proc. Fifth Int'l Conf. Computer Vision, Los Alamitos, CA, 1995, pp. 583-590.
Yeung et al., "Video Browsing using clustering and scene transitions on compressed sequences" IS & T/SPIE Symposium Proceedings, Feb. 1995, vol. 2417, pp. 399-413.
Meng et al., "Scene change detection in a MPEG Compressed video Sequence" IS & T/SPIE Symposium proceedings, vol. 2419, Feb. 1995.
Zhong et al., "Clustering methods for video browsing and annotation" sotrage and retrieval for Still Image and Video Databases IV, IS&T/SPIE's electronic Images: science & Tech. 96, vol. 2670 (1996).
Shahraray, B. "Scene Change Detecton and Content-Based sampling of video Sequences" SPIE conf. Digital Image Compression: Algorithms and Technologies 1995, vol. 2419.
Leung et al., "Picture Retrieval by Content description", Journal of Information Science; No. 18, pp. 111-119, 1992.
Meng et al., "Tools for Compressed-Domain Video Indexing and Editing", SPIE conference on storage and retrieval for Image and video Database, vol. 2670 (1996).
Li et al., "Modeling of moving objects in a video database", Proceeding of IEEE International Conference on Multimedia Computing and systems, pp. 336-343; Jun. 1997.
Li et al., "Modeling video temporal relationships in an object database management system", IS&T/SPIE international Symposium on Electronic Imaging: Multimedia Computing and Networking, pp. 80-91, Feb. 1997.
Oria et al., "Modeling images for content-based queried: the DISIMA Approach", Second international Conference on Visual Information Systems, pp. 339-346: Jun. 1997.

Lin et al., "A Robust image authentication Method surviving JPEG lossy compression"; SPIE 1998; pp. 28-30.

Lin et al., "A Robust image authentication Method distinguishin JPEG compression form malicious manipulation"; CU/CRT Technical Report 486-97-119, Dec. 1997; pp. 1-43.

Walton, Steven, "Image authentication for a slippery new age, knowing when images have been changed", Dr. Dobb's 1995.

Schneider et al., "A Robust content based digital sugnature for image authentication", Columbia University, Image and Advanced Television Laboratory, NY; 1996; pp. 227-230.

Li et al., "Issues and solutions for authenticating MPEG video", Columbia University, Department of Electrical Engineering, NY, Jan. 1999; pp. 54-65.

Kliot et al., "Invariant-Based shape retrieval in pictorial databases", Computer Vision and Image Understanding; Aug. 1998; 71(2): 182-197.

Schmid et al., "Local grayvalue invariants for image retrieval" IEEE Transaction on Pattern Analysis and Machine Intelligence; May 1997; 19(5): 530-535.v.

Cox et al., "Secure spread spectrum watermaking for multimedia", NEC Research Institute, Technical Report 95-10, Dec. 4, 1995; pp. 1 of 1 and 1-33.

Jacobs et al., "Fast Multiresolution Image Querying," Proc of SIGGRAPH, Los Angeles (Aug. 1995) pp. 277-286.

Kato et al., "Sketch Retrieval Method for Full Color Image Database—Query by Visual Example," Electro Technical Laboratory, MIDI, Tsukuba 305, Japan, IEEE (1992) pp. 530-532.

Netravali et al., Digital Pictures: Representation, Compression, and Standards, 2d. Ed., Plenum Press, New York and London (1995) pp. 340-344.

Del Bimbo et al., "Visual Image Retrieval by Elastic Matching of User Sketches," 19 IEEE Trans. on PAMI (1997) pp. 121-123.

Tong et al., "Rubric—An Environment for Full Text Information Retrieval," ACM, Jun. 1985, pp. 243-251.

Hjelsvold et al., "Searching and Browsing a Shared Video Database," IEEE, Aug. 1995, pp. 90-98.

Chabane Djeraba and Marinette Bouet "Digital Information Retrieval," Copyright 1997 ACM 0-89791-970-x/97/11 pp. 185-192.

Gong et al. (1995) "Automatic Parsing of TV Soccer Programs," IEEE, pp. 167-174.

John R. Smith (1999) "Digital Video Libraries and the Internet," IEEE, pp. 92-97.

Tonomura et al. (1990) "Content Oriented Visual Interface Using Video Icons for Visual Database Systems," Journal of Visual Languages and Computing, pp. 183-198.

Gunsel et al. (1998) "Temporal Video Segmentation Using Unsupervised Clustering and Semantic Object Tracking," Journal of Electronic Imaging 7(3), pp. 592-604.

Yoshinobu Tonomura (1991) "Video Handling Based on Structured Information for Hypermedia Systems," Proceedings of the International Conference on Multimedia Information Systems, pp. 333-344.

AMOS: An Active System for MPEG-4 Video Object Segmentation, Di Zhong and Shih-Chang, 647-651, o-8186-8821-1/98 (c) 1998 IEEE.

Gong Y. et al. A Generic Video Parsing System with a Scene Description Language (SDL). Real-Time Imaging, Feb. 1996, vol. 2, No. 1, pp. 45-49.

Russ, John C. The Image Processing Handbook. Boca Raton, Florida: CRC Press. 1995, 2nd ed., pp. 361-376.

Chang, S.-F. et al. VideoQ: An Automated Content-Based Video Search System Using Visual Cues. Proceedings ACM Multimedia 97, Seattle, WA, Nov. 9-13, 1997, pp. 313-324.

Chang, S.-F. Content-Based Indexing and Retrieval of Visual Information. IEEE Signal Processing Magazine. Jul. 1997, vol. 14, No. 4, pp. 45-48.

Li, W. et al. Vision: A Digital Video Library, Proceedings of the 1st ACM International Conference on Digital Libraries, Bethesda, MD, Mar. 20-23, 1996, pp. 19-27.

International Search Report PCT/US09/047492, Aug. 27, 2009.
International Search Report PCT/US09/40029, May 29, 2009.
International Search Report PCT/US99/26125, Apr. 3, 2000.
International Search Report PCT/US02/39247, Dec. 12, 2003.
International Search Report PCT/US00/34803, Oct. 29, 2001.
International Search Report PCT/US99/26126, May 10, 2000.
International Search Report PCT/US02/16599, Nov. 22, 2002.
International Search Report PCT/US02/31488, Feb. 4, 2003.
International Search Report PCT/US99/26127, Apr. 6, 2000.
International Search Report PCT/US10/023494, Apr. 1, 2000.
International Search Report PCT/US99/04776, May 14, 1999.
International Search Report PCT/USO4/28722, Jun. 1, 2005.
International Search Report PCT/US06/007862, Mar. 29, 2007.
International Search Report PCT/US00/02488, May 25, 2000.
International Search Report PCT/US00/018231, Oct. 4, 2000.
International Search Report PCT/US09/069237, Mar. 1, 2010.
International Search Report PCT/US99/022790, Feb. 24, 1999.
International Search Report PCT/US99/22264, Feb. 11, 2000.
International Search Report PCT/US01/22485, May 11, 2003.
International Search Report PCT/US98/09124, Oct. 8, 1998.
International Search Report PCT/US03/12858, Nov. 25, 2003.

Geiger et al., "Dynamic Programming for Detecting, Tracking, and Matching Deformable Contours" IEEE Transactions on Pattern Analysis and Machine Intelligence, 17(3): 294-302, Mar. 1, 1995, XP000498121 *Abstract*.

M. Schaar, H. Radha, Adaptive motion-compensation fine-granular-scalability (AMC-FGS) for wireless video, IEEE Trans. on CSVT, vol. 12, No. 6, 360-371, 2002.

A. M. Tourapis. "Enhanced Predictive Zonal Search for Single and Multiple Frame Motion Estimation," Proceedings of Visual Communications and Image Processing 2002 (VCIP-2002), San Jose, CA, Jan 2002, pp. 1069-1079.

H.-Y. Cheong, A. M. Tourapis, "Fast Motion Estimation within the H.264 codec," in proceedings of ICME-2003, Baltimore, MD, Jul. 6-9, 2003.

B. Girod, A. Aaron, S. Rane and D. Rebollo-Monedero , "Distributed video coding," *Proc. of the IEEE*, Special Issue on Video Coding and Delivery, 2005; pp. 1-12.

Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004.

K. Lengwehasatit and A. Ortega, " Rate Complexity Distortion Optimization for Quadtree-Based DCT Coding",ICIP 2000, Vancouver,BC, Canada, Sep. 2000.

A. Ray and H. Radha, "Complexity-Distortion Analysis of H.264/JVT Decoder on Mobile Devices," Picture Coding Symposium (PCS), Dec. 2004.

H. Kim and Y. Altunbasak, "Low-complexity macroblock mode selection for the H.264/AVC encoders," IEEE Int. Conf. on Image Processing, Suntec City, Singapore, Oct. 2004.

X. Lu, E. Erkip, Y. Wang and D. Goodman, "Power efficient multimedia communication over wireless channels", IEEE Journal on Selected Areas on Communications, Special Issue on Recent Advances in Wireless Multimedia, vol. 21, No. 10, pp. 1738-1751, Dec. 2003.

Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCASI) 2001, May 2001, Sydney, Australia.

Y. Eisenberg, C. E. Luna, T. N. Pappas, R. Berry, A.K. Katsaggelos, Joint source coding and transmission power management for energy efficient wireless video communications, CirSysVideo(12), No. 6, Jun. 2002, pp. 411-424.

National's PowerWise™ technology. http://www.national.com/appinfo/power/powerwise.html , Nov. 11, 2002.

X. Zhou, E. Li, and Y.-K. Chen, "Implementation of H.264 Decoder on General-Purpose Processors with Media Instructions", in Proc. of SPIE Visual Communications and Image Processing, Jan. 2003.

T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004.

T. Chiang and Y.-Q. Zhang, "A New Rate Control Scheme Using Quadratic Rate Distortion Model," IEEE Trans. Circuits Syst. Video Technol., vol. 7, pp. 246-250, Feb. 1997.

G. J. Sullivan and T. Wiegand, Rate-Distortion Optimization for Video Compression IEEE Signal Processing Magazine, vol. 15, No. 6, pp. 74-90, Nov. 1998.

A. M. Tourapis, F. Wu, S. Li, "Direct mode coding for bi-predictive pictures in the JVT standard", ISCAS2003, vol. 2, 700-703, Thailand, 2003.

V. Lappalainen, A. Hallapuro, and T.D. Hämäläinen, "Complexity of Optimized H.26L Video Decoder Implementation," IEEE Trans. Circuits Syst. Video Technol., vol. 13, pp. 717-725. Jul. 2003.

T. Wedi; H.G. Musmann, Motion- and aliasing-compensated prediction for hybrid video codingPage(s): IEEE Trans. Circuits Syst. Video Technol., vol. 13, pp. 577-586. Jul. 2003.

T. Wiegand, G. J. Sullivan, G. Bjontegaard, A. Luthra, "Overview of the H.264/AVC Video Coding Standard," IEEE Trans. Circuits Syst. Video Technol., vol. 13, pp. 560-576. Jul. 2003.

Wang, et al. "Dynamic rate scaling of coded digital video for IVOD applications." Transactions on Consumer Electronics, vol. 44(3), Aug. 1998, pp. 743-749.

Wee, et al., "Field-to-frame transcoding with spatial and temporal downsampling." Proceedings of the 1999 International Conference on Image Processing, vol. 4, Oct. 1999.

Wee, et al., "Secure scalable streaming enabling transcoding without decryption." Proceedings of the 2001 International Conference on Image Processing, vol. 1 of 3, Oct. 2001.

Wee, et al., "Secure scalable video streaming for wireless networks." Proceedings of the 2001 IEEE International Conference on Acoustics, Speech, and Signal Process, vol. 4 of 6, May 2001, pp. 2049-2052.

Sorial, et al., "Selective requantization for transcoding of MPEG compressed video." Proceedings of the 2000 IEEE International Conference on Multimrdia and Expo, vol. 1, 2000, pp. 217-220.

Kim, et al., "Description of Utility function based on optimum transcoding" ISO/IEC JTC1/SC/ WG11 MPEG02/M8319, Apr. 2002.

Mukherjee, et al., "Structured scalable meta-formsats (SSM) for digital item adaptation" Proceedings of the SPIE, SPIE, Bellingham, VA, US, vol. 5018, Jan. 2003, pp. 148-167.

Friedman, G.L., "The Trustworthy Digital Camera: Restoring Credibility to the Photographic Image", IEEE Transactions on Consumer Electronics, 39(4): 905-910; Nov. 1, 1993, XP000423080.

Lee et al., A Watermarking Sequence Using Parities of Error Control Coding for Image Authentication and Correction, IEEE Transactions on Consumer electronics, 46(2): 313-317, May 2000, XP00110026.

Tuong Dao, IEEE Proceedings, ISBN: 0-8186-8464-X; pp. 88-97, especially pp. 88-90.

Sajda et al., "In a blink of an eye and a switch of a transistor: Cortically-cuopled computer vision", Journal of Latex Class Files, Jan. 2007, 6(1): 1-14.

Wang et al., "Columbia TAG System—Transductive Annotation by Graph Version 1.0", Columbia University ADVENT Technical Report #225-2008-3, Oct. 15, 2008, entire document.

U.S. Appl. No. 11/615,120, filed Dec. 22, 2006.
U.S. Appl. No. 12/574,716, filed Oct. 7, 2009.
U.S. Appl. No. 11/615,120, filed Apr. 6, 2010 Issue Fee payment.
U.S. Appl. No. 11/615,120, filed Jan. 14, 2010 Notice of Allowance.
U.S. Appl. No. 11/615,120, filed Sep. 4, 2009 Response to Non-Final Office Action.
U.S. Appl. No. 11/615,120, filed May 4, 2009 Non-Final Office Action.
U.S. Appl. No. 12/574,716, filed Feb. 1, 2012 Issue Fee payment.
U.S. Appl. No. 12/574,716, filed Nov. 10, 2011 Notice of Allowance.
U.S. Appl. No. 10/965,040, filed Jun. 7, 2012 Issue Fee payment.
U.S. Appl. No. 10/965,040, filed Mar. 15, 2012 Notice of Allowance.
U.S. Appl. No. 11/846,088, filed Jun. 7, 2012 Non-Final Office Action.
U.S. Appl. No. 12/969,101, filed May 24, 2012 Non-Final Office Action.
U.S. Appl. No. 11/960,424, filed Jun. 29, 2012 Non-Final Office Action.

Amir et al., "IBM research TRECVID-2003 video retrieval system", Proc. NIST Text Retrieval Conf (TREC), 2003.

Hellman et al., "Probability of error, equivocation, and the chernoff bound", IEEE Trans. on Information Theory, 16(4):368-372, 1970.

Naphade et al., "A factor graph fraemwork for semantic video indexing", IEEE Trans on CSVT, 12(1):40-52, 2002.

Pack et al., "Experiments in constructing belief networks for image classification systems", Proc. ICIP, Vancouver, Canada, 2000.

Smith et al., "Multimedia semantic indexing using model vectors", Proc. ICME, 3:445-448, 2003.

Vasconcelos, eature selection by maximum marginal diversity: optimality and implications for visual recognition, CVPR 1:762-769, 2003.

U.S. Appl. No. 10/965,040, filed Nov. 2, 2011 Notice of Appeal.

Gholamhosein et al., "Semantic Clustering and Querying on Heterogeneous Features for Visual Data", Proceedings of the ACM Multimedia 98, MM '98, Bristol, Sep. 12-16, 1998, ACM International Multimedia Conference, New York, NY: ACM, US, Vol. Conf. 6, Sep. 12, 1998, pp. 3-12, XP000977482.

Amir et al., "IBM research TRECVID-2003 video retrieval system", Proc. NIST Text Retrieval Conf. (TREC), 2003.

* cited by examiner

VIDEO DESCRIPTION SYSTEM AND METHOD

CROSS-REFERENCE TO RELATED APPLICATIONS

This application is a continuation of application Ser. No. 09/831,218 filed Dec. 11, 2001 now U.S. Pat. No. 7,143,434, which claims priority to U.S. provisional patent application Ser. No. 60/118,020, filed Feb. 1, 1999, U.S. provisional patent application Ser. No. 60/118,027, filed Feb. 1, 1999 and U.S. provisional patent application Ser. No. 60,107,463, filed Nov. 6, 1998, each of which are incorporated by reference herein, and from which priority is claimed.

STATEMENT REGARDING FEDERALLY SPONSORED RESEARCH OR DEVELOPMENT

This invention was made with government support under grant number 8811111 awarded by the National Science Foundation. The government has certain rights in the invention.

FIELD OF THE INVENTION

The present invention relates to techniques for describing multimedia information, and more specifically, to techniques which describe video information and the content of such information.

BACKGROUND OF THE INVENTION

With the maturation of the global Internet and the widespread employment of regional networks and local networks, digital multimedia information has become increasingly accessible to consumers and businesses. Accordingly, it has become progressively more important to develop systems that process, filter, search and organize digital multimedia information, so that useful information can be culled from this growing mass of raw information.

At the time of filing the instant application, solutions exist that allow consumers and business to search for textual information. Indeed, numerous text-based search engines, such as those provided by yahoo.com, goto.com, excite.com and others are available on the World Wide Web, and are among the most visited Web sites, indicating the significant of the demand for such information retrieval technology.

Unfortunately, the same is not true for multimedia content, as no generally recognized description of this material exists. In this regard, there have been past attempts to provide multimedia databases which permit users to search for pictures using characteristics such as color, texture and shape information of video objects embedded in the picture. However, at the closing of the 20th Century, it is not yet possible to perform a general search the Internet or most regional or local networks for multimedia content, as no broadly-recognized description of this material exists. Moreover, the need to search for multimedia content is not limited to databases, but extends to other applications, such as digital broadcast television and multimedia telephony.

One industry wide attempt to develop a standard multimedia description framework has been through the Motion Pictures Expert Group's ("MPEG") MPEG-7 standardization effort. Launched in October 1996, MPEG-7 aims to standardize content descriptions of multimedia data in order to facilitate content-focused applications like multimedia searching, filtering, browsing and summarization. A more complete description of the objectives of the MPEG-7 standard are contained in the International Organisation for Standardisation document ISO/IEC JTC1/SC29/WG11 N2460 (October 1998), the content of which is incorporated by reference herein.

The MPEG-7 standard has the objective of specifying a standard set of descriptors as well as structures (referred to as "description schemes") for the descriptors and their relationships to describe various types of multimedia information. MPEG-7 also proposes to standardize ways to define other descriptors as well as "description schemes" for the descriptors and their relationships. This description, i.e. the combination of descriptors and description schemes, shall be associated with the content itself, to allow fast and efficient searching and filtering for material of a user's interest. MPEG-7 also proposes to standardize a language to specify description schemes, i.e. a Description Definition Language ("DDL"), and the schemes for binary encoding the descriptions of multimedia content.

At the time of filing the instant application, MPEG is soliciting proposals for techniques which will optimally implement the necessary description schemes for future integration into the MPEG-7 standard. In order to provide such optimized description schemes, three different multimedia-application arrangements can be considered. These are the distributed processing scenario, the content-exchange scenario, and the format which permits the personalized viewing of multimedia content.

Regarding distributed processing, a description scheme must provide the ability to interchange descriptions of multimedia material independently of any platform, any vendor, and any application, which will enable the distributed processing of multimedia content. The standardization of interoperable content descriptions will mean that data from a variety of sources can be plugged into a variety of distributed applications, such as multimedia processors, editors, retrieval systems, filtering agents, etc. Some of these applications may be provided by third parties, generating a sub-industry of providers of multimedia tools that can work with the standardized descriptions of the multimedia data.

A user should be permitted to access various content providers' web sites to download content and associated indexing data, obtained by some low-level or high-level processing, and proceed to access several tool providers' web sites to download tools (e.g. Java applets) to manipulate the heterogeneous data descriptions in particular ways, according to the user's personal interests. An example of such a multimedia tool will be a video editor. A MPEG-7 compliant video editor will be able to manipulate and process video content from a variety of sources if the description associated with each video is MPEG-7 compliant. Each video may come with varying degrees of description detail, such as camera motion, scene cuts, annotations, and object segmentations.

A second scenario that will greatly benefit from an interoperable content-description standard is the exchange of multimedia content among heterogeneous multimedia databases. MPEG-7 aims to provide the means to express, exchange, translate, and reuse existing descriptions of multimedia material.

Currently, TV broadcasters, Radio broadcasters, and other content providers manage and store an enormous amount of multimedia material. This material is currently described manually using textual information and proprietary databases. Without an interoperable content description, content users need to invest manpower to translate manually the descriptions used by each broadcaster into their own proprietary scheme. Interchange of multimedia content descriptions would be possible if all the content providers embraced the same content description schemes. This is one of the objectives of MPEG-7.

Finally, multimedia players and viewers that employ the description schemes must provide the users with innovative capabilities such as multiple views of the data configured by the user. The user should be able to change the display's configuration without requiring the data to be downloaded again in a different format from the content broadcaster.

The foregoing examples only hint at the possible uses for richly structured data delivered in a standardized way based on MPEG-7. Unfortunately, no prior art techniques available at present are able to generically satisfy the distributed processing, content-exchange, or personalized viewing scenarios. Specifically, the prior art fails to provide a technique for capturing content embedded in multimedia information based on either generic characteristics or semantic relationships, or to provide a technique for organizing such content. Accordingly, there exists a need in the art for efficient content description schemes for generic multimedia information.

SUMMARY OF THE INVENTION

It is an object of the present invention to provide a description scheme for video content.

It is a further object of the present invention to provide a description scheme for video content which is extensible.

It is another object of the present invention to provide a description scheme for video content which is scalable.

It is yet another object of the present invention to provide a description scheme for video content which satisfies the requirements of proposed media standards, such as MPEG-7.

It is an object of the present invention to provide systems and methods for describing video content.

It is a further object of the present invention to provide systems and methods for describing video content which are extensible.

It is another object of the present invention to provide systems and method for describing video content which are scalable.

It is yet another object of the present invention to provide systems and methods for describing video content which satisfies the requirements of proposed media standards, such as MPEG-7

In accordance with the present invention, a first method of describing video content in a computer database record includes the steps of establishing a plurality of objects in the video; characterizing the objects with a plurality of features of the objects; and relating the objects in a hierarchy in accordance with the features. The method can also include the further the step of relating the objects in accordance with at least one entity relation graph.

Preferably, the objects can take the form of local objects (such as a group of pixels within a frame), segment objects (which represent one or more frames of a video clip) and global objects. The objects can be extracted from the video content automatically, semi-automatically, or manually.

The features used to define the video objects can include visual features, semantic features, media features, and temporal features. A further step in the method can include assigning feature descriptors to further define the features.

In accordance with another embodiment of the invention, computer readable media is programmed with at least one video description record describing video content. The video description record, which is preferably formed in accordance with the methods described above, generally includes a plurality of objects in the video; a plurality of features characterizing said objects: and a hierarchy relating at least a portion of the video objects in accordance with said features.

Preferably, the description record for a video clip further includes at least one entity relation graph. It is also preferred that the features include at least one of visual features, semantic features, media features, and temporal features. Generally, the features in the description record can be further defined with at least one feature descriptor.

A system for describing video content and generating a video description record in accordance with the present invention includes a processor, a video input interface operably coupled to the processor for receiving the video content, a video display operatively coupled to the processor; and a computer accessible data storage system operatively coupled to the processor. The processor is programmed to generate a video description record of the video content for storage in the computer accessible data storage system by performing video object extraction processing, entity relation graph processing, and object hierarchy processing of the video content.

In this exemplary system, video object extraction processing can include video object extraction processing operations and video object feature extraction processing operations.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1A:
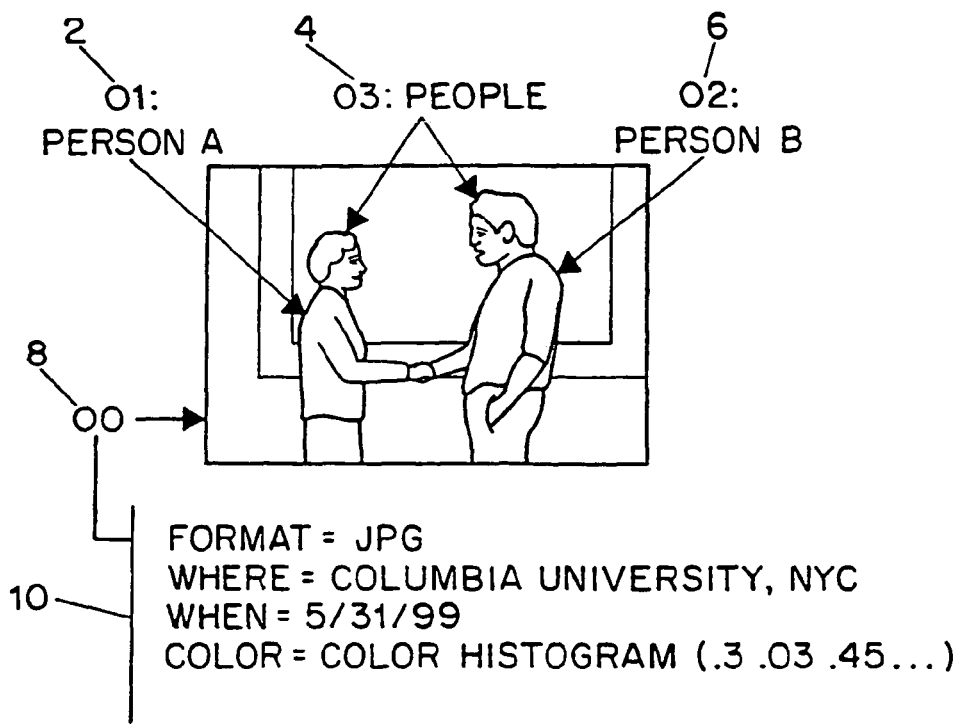
FIG. 1A is an exemplary image for the image description system of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

The present invention constitutes a description scheme (DS) for images, wherein simple but powerful structures representing generic image data are utilized. Although the description scheme of the present invention can be used with any type of standard which describes image content, a preferred embodiment of the invention is used with the MPEG-7 standard. Although any Description Definition Language (DDL) may be used to implement the DS of the present invention, a preferred embodiment utilizes the extensible Markup Language (XML), which is a streamlined subset of SGML (Standard Generalized Markup Language, ISO 8879) developed specifically for World Wide Web applications. SGML allows documents to be self-describing, in the sense that they describe their own grammar by specifying the tag set used in the document and the structural relationships that those tags represent. XML retains the key SGML advantages in a language that is designed to be vastly easier to learn, use, and implement than full SGML. A complete description of XML can be found at the World Wide Web Consortium's web page on XML, at http://www.w3.org/XML/, the contents of which is incorporated by reference herein.

The primary components of a characterization of an image using the description scheme of the present invention are objects, feature classifications, object hierarchies, entity-relation graphs, multiple levels of abstraction, code downloading, and modality transcoding, all of which will be described in additional detail below. In the description scheme of the present invention, an image document is represented by a set of objects and relationships among objects. Each object may have one or more associated features, which are generally ground into the following categories: media features, visual features, and semantic features. Each feature can include descriptors that can facilitate code downloading by pointing to external extraction and similarity matching code. Relationships among objects can be described by object hierarchies and entity-relation graphs. Object hierarchies can also include the concept of multiple levels of abstraction. Modality transcoding allows user terminals having different capabilities (such as palmpilots, cellular telephones, or different types of personal computers (PC's), for example) to receive the same image content in different resolutions and/or different modalities.

As described above, a preferred embodiment of the image description system of the present invention is used with the MPEG-7 standard. In accord with this standard, this preferred embodiment uses objects as the fundamental entity in describing various levels of image content, which can be defined along different dimensions. For example, objects can be used to describe image regions or groups of image regions. High-level objects can in turn be used to describe groups of primitive objects based on semantics or visual features. In addition, different types of features can be used in connection with different levels of objects. For instance, visual features can be applied to objects corresponding to physical components in the image content, whereas semantic features can be applied to any level of object.

In addition, the image description system of the present invention provides flexibility, extensibility, scalability and convenience of use. In the interest of enhanced flexibility, the present invention allows portions of the image description system to be instantiated, uses efficient categorization of features and clustering of objects by way of an clustering hierarchy, and also supports efficient linking, embedding and downloading of external feature descriptors and execution code. The present invention also provides extensibility by permitting elements defined in the description scheme to be used to derive new elements for different domains. Scalability is provided by the present invention's capability to define multiple abstraction levels based on any arbitrary set of criteria using object hierarchies. These criteria can be specified in terms of visual features (size and color, for example), semantic relevance (relevance to user interest profile, for example) and/or service quality (media features, for example). The present invention is convenient to use because it specifies a minimal set of components: namely, objects, feature classes, object hierarchies, and entity-relation graphs. Additional objects and features can be added in a modular and flexible way. In addition, different types of object hierarchies and entity-relation graphs can each be defined in a similar fashion.

Under the image description system of the present invention, an image is represented as a set of image objects, which are related to one another by object hierarchies and entity-relation graphs. These objects can have multiple features which can be linked to external extraction and similarity matching code. These features are categorized into media, visual, and semantic features, for example. Image objects can be organized in multiple different object hierarchies. Non-hierarchical relationships among two or more objects can be described using one or more different entity-relation graphs. For objects contained in large images, multiple levels of abstraction in clustering and viewing such objects can be implemented using object hierarchies. These multiple levels of abstraction in clustering and viewing such images can be based on media, visual, and/or semantic features, for example. One example of a media feature includes modality transcoding, which permits users having different terminal specifications to access the same image content in satisfactory modalities and resolutions.

Figure 1B:
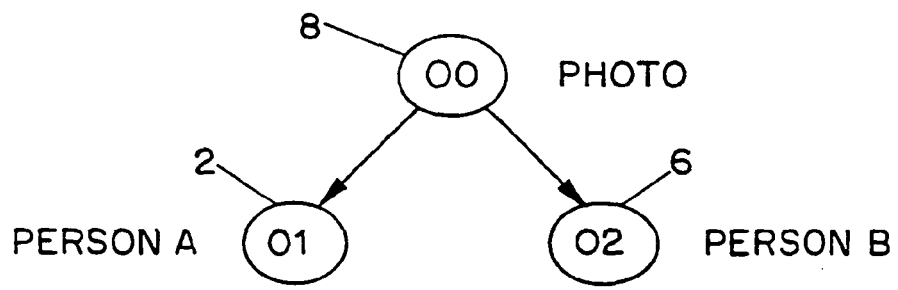
FIG. 1B is an exemplary object hierarchy for the image description system of the present invention.
Figure 1C:
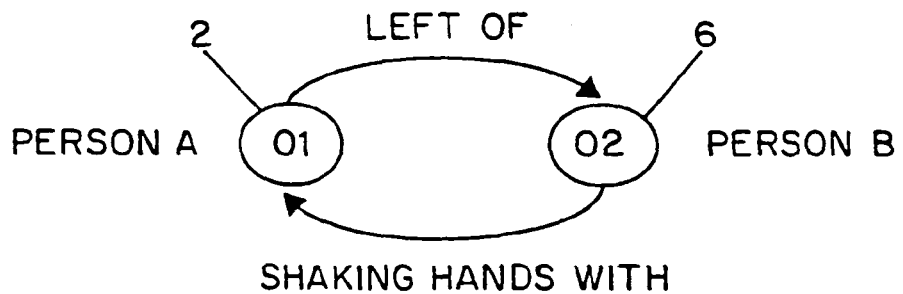
FIG. 1C is an exemplary entity relation graph for the image description system of the present invention.

The characteristics and operation of the image description system of the present invention will now be presented in additional detail. FIGS. 1A, 1B and 1C depict an exemplary description of an exemplary image in accordance with the image description system of the present invention. FIG. 1A depicts an exemplary set of image objects and exemplary corresponding object features for those objects. More specifically, FIG. 1A depicts image object 1 (i.e., O1) 2 ("Person A"), O2 6 ("Person B") and O3 4 ("People") contained in O0 8 (i.e. the overall exemplary photograph), as well as exemplary features 10 for the exemplary photograph depicted. FIG. 1B depicts an exemplary spatial object hierarchy for the image objects depicted in FIG. 1A, wherein O0 8 (the overall photograph) is shown to contain O1 2 ("Person A") and O2 6 ("Person B"). FIG. 1C depicts an exemplary entity-relation (E-R) graph for the image objects depicted in FIG. 1A, wherein O1 2 ("Person A") is characterized as being located to the left of, and shaking hands with, O2 6 ("Person B").

Figure 2:
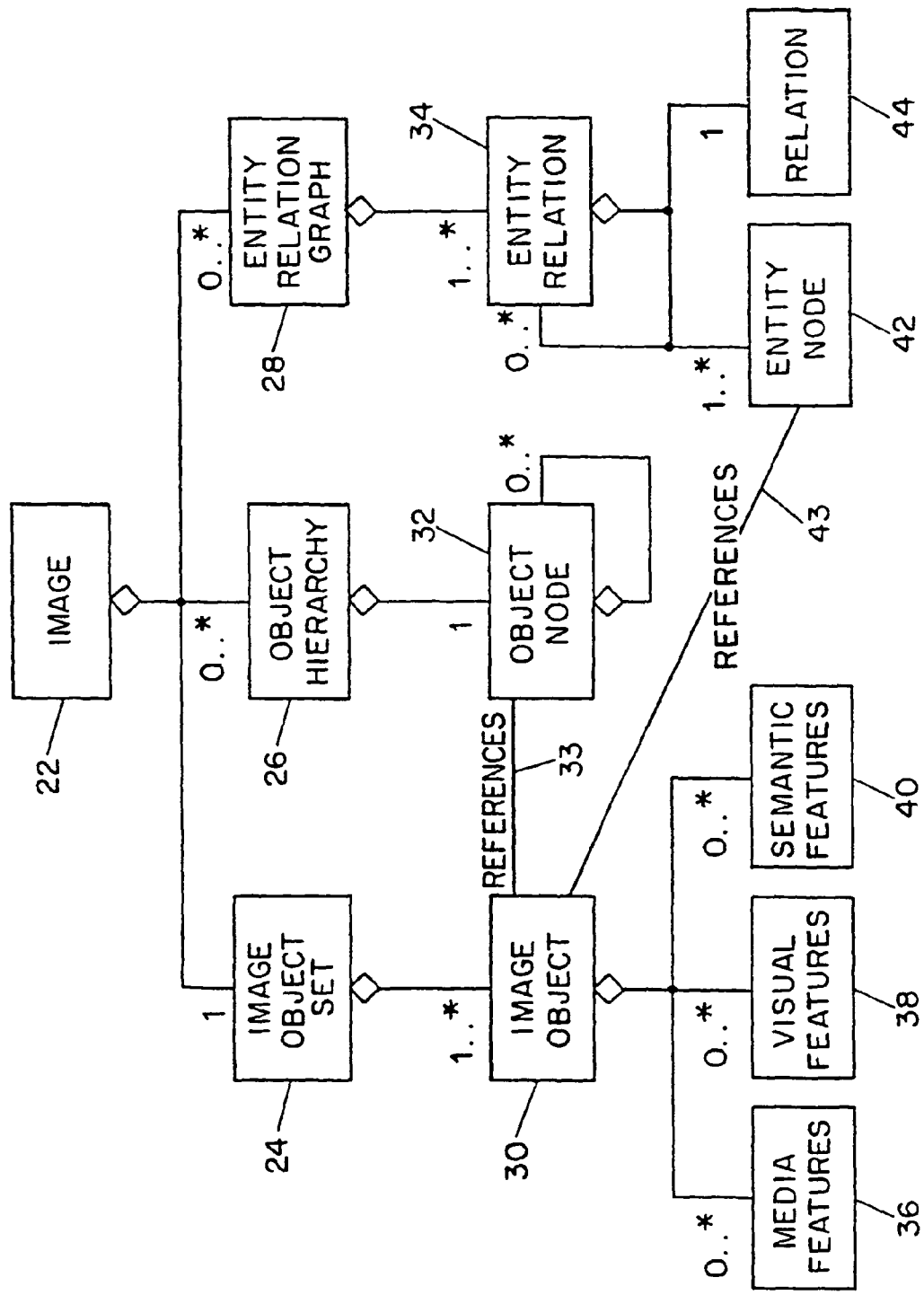
FIG. 2 is an exemplary block diagram of the image description system of the present invention.

FIG. 2 depicts an exemplary graphical representation of the image description system of the present invention, utilizing the conventional Unified Modeling Language (UML) format and notation. Specifically, the diamond-shaped symbols depicted in FIG. 2 represent the composition relationship. The range associated with each element represents the frequency in that composition relationship. Specifically, the nomenclature "0 . . . *" denotes "greater than or equal to 0;" the nomenclature "1 . . . *" denotes "greater than or equal to 1."

In the following discussion, the text appearing between the characters "<" and ">" denotes the characterization of the referenced elements in the XML preferred embodiments which appear below. In the image description system of the present invention as depicted in FIG. 2, an image element 22 (<image>), which represents an image description, includes an image object set element 24 (<image_object_set>), and may also include one or more object hierarchy elements 26 (<object_hierarchy>) and one or more entity-relation graphs 28 (<entity_relation_graph>). Each image object set element 24 includes one or more image object elements 30. Each image object element 30 may include one or more features, such as media feature elements 36, visual feature elements 38 and/or semantic feature elements 40. Each object hierarchy element 26 contains an object node element 32, each of which may in turn contain one or more additional object node elements 32. Each entity-relation graph 28 contains one or more entity relation elements 34. Each entity relation element 34 in turn contains a relation element 44, and may also contain one or more entity node elements 42.

An object hierarchy element 26 is a special case of an entity-relation graph 28, wherein the entities are related by containment relationships. The preferred embodiment of the image description system of the present invention includes object hierarchy elements 26 in addition to entity relationship graphs 28, because an object hierarchy element 26 is a more efficient structure for retrieval than is an entity relationship graph 28. In addition, an object hierarchy element 26 is the most natural way of defining composite objects, and MPEG-4-objects are constructed using hierarchical structures.

To maximize flexibility and generality, the image description system of the present invention separates the definition of the objects from the structures that describe relationships among the objects. Thus, the same object may appear in different object hierarchies 26 and entity-relation graphs 28. This avoids the undesirable duplication of features for objects that appear in more than one object hierarchy 26 and/or entity-relation graph 28. In addition, an object can be defined without the need for it to be included in any relational structure, such as an object hierarchy 26 or entity-relation graph 28, so that the extraction of objects and relations among objects can be performed at different stages, thereby permitting distributed processing of the image content.

Referring to FIGS. 1A, 1B, 1C and FIG. 2, an image object 30 refers to one or more arbitrary regions of an image, and therefore can be either continuous or discontinuous in space. In FIGS. 1A, 1B and 1C, O1 2 ("Person A"), O2 6 ("Person B"), and O0 8 (i.e., the photograph) are objects with only one associated continuous region. On the other hand, O3 4 ("People") is an example of an object composed of multiple regions separated from one another in space. A global object contains features that are common to an entire image, whereas a local object contains only features of a particular section of that image. Thus, in FIGS. 1A, 1B and 1C, O0 8 is a global object representing the entire image depicted, whereas O1 2, O2 4 and O3 4 are each local objects representing a person or persons contained within the overall image.

Various types of objects which can be used in connection with the present invention include visual objects, which are objects defined by visual features such as color or texture; media objects; semantic objects; and objects defined by a combination of semantic, visual, and media features. Thus, an object's type is determined by the features used to describe that object. As a result, new types of objects can be added as necessary. In addition, different types of objects may be derived from these generic objects by utilizing inheritance relationships, which are supported by the MPEG-7 standard.

As depicted in FIG. 2, the set of all image object elements 30 (<image_object>) described in an image is contained within the image object set element 24 (<image_object_set>). Each image object element 30 can have a unique identifier within an image description. The identifier and the object type (e.g., local or global) are expressed as attributes of the object element ID and type, respectively. An exemplary implementation of an exemplary set of objects to describe the image depicted in FIGS. 1A, 1B and 1C is shown below listed in XML. In all XML listings shown below, the text appearing between the characters "<!-" and "->" denotes comments to the XML code:

```
<image_object_set>
    <image_object id="O0" type="GLOBAL"> </image_object>
    <!-- Photograph -->
    <image_object id="O1" type="LOCAL"> </image_object>
    <!-- Person A -->
    <image_object id="O2" type="LOCAL"> </image_object>
    <!-- Person B -->
    <image_object id="O3" type="LOCAL"> </image_object>
    <!-- People -->
</image_object_set>
```

As depicted in FIG. 2, image objects 30 may for example contain three feature class elements that group features together according to the information conveyed by those features. Examples of such feature class elements include media features 36 (<img_obj_media_features>), visual features 38 (<img_obj_visual_features>), and semantic features 40 (<img_obj_media_features>). Table 1 below denotes an exemplary list of features for each of these feature classes.

TABLE 1

Exemplary Feature Classes and Features.

| Feature Class | Features |
| --- | --- |
| Semantic | Text Annotation, Who, What Object, What Action, Why, When, Where |
| Visual | Color, Texture, Position, Size, Shape, Orientation |
| Media | File Format, File Size, Color Representation, Resolution, Data File Location, Modality Transcoding, Author, Date of Creation |

Each feature element contained in the feature classes in an image object element 30 will include descriptors in accordance with the MPEG-7 standard. Table 2 below denotes exemplary descriptors that may be associated with certain of the exemplary visual features denoted in Table 1. Specific descriptors such as those denoted in Table 2 may also contain links to external extraction and similarity matching code. Although Tables 1 and 2 denote exemplary features and descriptors, the image description system of the present invention may include, in an extensible and modular fashion, any number of features and descriptors for each object.

TABLE 2

Exemplary Visual Features and Associated Descriptors.

| Feature | Descriptors |
|---|---|
| Color | Color Histogram, Dominant Color, Color Coherence Vector, Visual Sprite Color |
| Texture | Tamura, MSAR, Edge Direction Histogram, DCT Coefficient Energies, Visual Sprite Texture |
| Shape | Bounding Box, Binary Mask, Chroma Key, Polygon Shape, Fourier Shape, Boundary, Size, Symmetry, Orientation |

The XML example shown below denotes an example of how features and descriptors can be defined to be included in an image object 30. In particular, the below example defines the exemplary features 10 associated with the global object O0 depicted in FIGS. 1A, 1B and 1C, namely, two semantic features ("where" and "when"), one media feature ("file format"), and one visual feature ("color" with a "color histogram" descriptor). An object can be described by different concepts (<concept>) in each of the semantic categories as shown in the example below.

```
<image_object id="O0" type="GLOBAL"> <!-- Global object:
Photograph -->
    <img_obj_semantic_features>
        <where>
            <concept> Columbia University, NYC </concept>
            <concept> Outdoors </concept>
        </where>
        <when> <concept> 5/31/99 </concept> </when>
    </img_obj_semantic_features>
    <img_obj_media_features>
        <file_format> JPG </file_format>
    </img_obj_media_features>
    <img_obj_visual_features>
        <color>
            <color_histogram>
                <value format="float[166]"> .3.03.45 ... </value>
            </color_histogram>
        </color>
    </img_obj_visual_features>
</image_global_object>
```

As depicted in FIG. 2, in the image description system of the present invention the object hierarchy element 26 can be used to organize the image objects 30 in the image object set 24, based on different criteria such as media features 36, visual features 38, semantic features 40, or any combinations thereof. Each object hierarchy element 26 constitutes a tree of object nodes 32 which reference image object elements 30 in the image object set 24 via link 33.

Figure 3A:
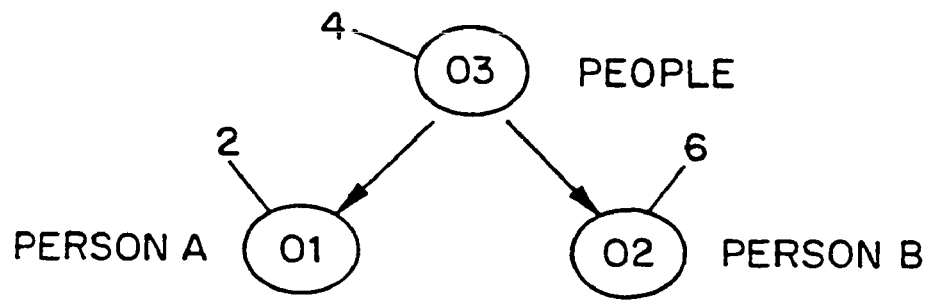
FIG. 3A is an exemplary object hierarchy for the image description system of the present invention.
Figure 3B:
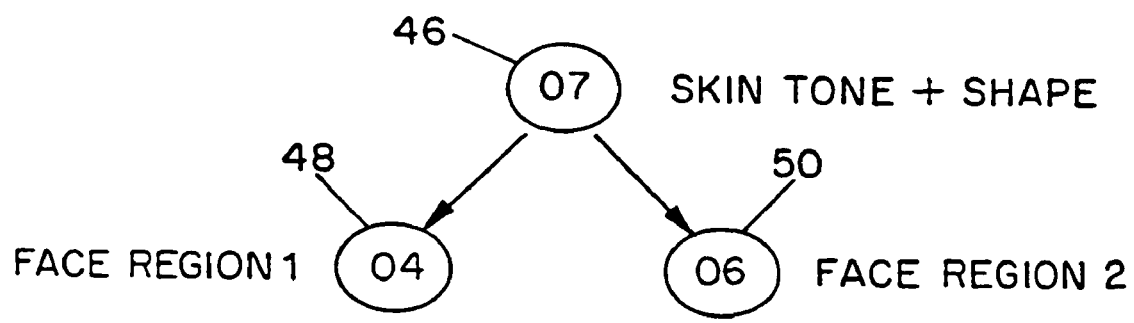
FIG. 3B is another exemplary object hierarchy for the image description system of the present invention.

An object hierarchy 26 involves a containment relation from one or more child nodes to a parent node. This containment relation may be of numerous different types, depending on the particular object features being utilized, such as media features 36, visual features 38 and/or semantic features 40, for example. For example, the spatial object hierarchy depicted in FIG. 1B describes a visual containment, because it is created in connection with a visual feature, namely spatial position. FIGS. 3A and 3B depict two additional exemplary object hierarchies. Specifically, FIG. 3A depicts an exemplary hierarchy for the image objects depicted in FIG. 1A, based on the "who" semantic feature as denoted in Table 1. Thus, in FIG. 3A, O3 4 ("People") is shown to contain O1 2 ("Person A") and O2 6 ("Person B"). FIG. 3B depicts an exemplary hierarchy based on exemplary color and shape visual features such as those denoted in Table 1. In FIG. 3B, O7 46 could for example be defined to be the corresponding region of an object satisfying certain specified color and shape constraints. Thus, FIG. 3B depicts O7 46 ("Skin Tone & Shape") as containing O4 48 ("Face Region 1") and O6 50 ("Face Region 2"). Object hierarchies 26 combining different features can also be constructed to satisfy the requirements of a broad range of application systems.

As further depicted in FIG. 2, each object hierarchy element 26 (<object_hierarchy>) contains a tree of object nodes (ONs) 32. The object hierarchies also may include optional string attribute types. If such string attribute types are present, a thesaurus can provide the values of these string attribute types so that applications can determine the types of hierarchies which exist. Every object node 32 (<object_node>) references an image object 30 in the image object set 24 via link 33. Image objects 30 also can reference back to the object nodes 32 referencing them via link 33. This bi-directional linking mechanism permits efficient transversal from image objects 30 in the image object set 24 to the corresponding object nodes 32 in the object hierarchy 26, and vice versa. Each object node 32 references an image object 30 through an attribute (object_ref) by using a unique identifier of the image object. Each object node 32 may also contain a unique identifier in the form of an attribute. These unique identifiers for the object nodes 32 enable the objects 30 to reference back to the object nodes which reference them using another attribute (object_node_ref). An exemplary XML implementation of the exemplary spatial object hierarchy depicted in FIG. 1B is expressed below.

```
<object_hierarchy type="SPATIAL"> <!-- Object hierarchy: spatial
hierarchy -->
    <object_node id="ON0" object_ref ="O0"> <!- Photograph -->
        <object_node id="ON1" object_ref="O1"> </object_node>
        <!-- Person A -->
        <object_node id="ON2" object_ref="O2"> </object_node>
        <!-- Person B -->
    </object_node>
</object_hierarchy>
```

Object hierarchies 26 can also be used to build clustering hierarchies and to generate multiple levels of abstraction. In describing relatively large images, such as satellite photograph images for example, a problem normally arises in describing and retrieving, in an efficient and scalable manner, the many objects normally contained in such images. Clustering hierarchies can be used in connection with the image description system of the present invention to provide a solution to this problem.

Figure 4A:
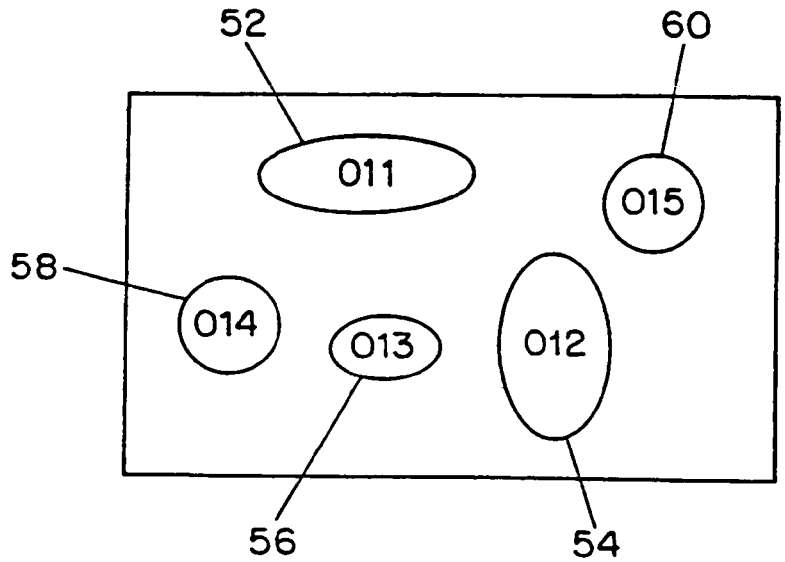
FIG. 4A is a representation of an exemplary image for the image description system of the present invention.
Figure 4B:
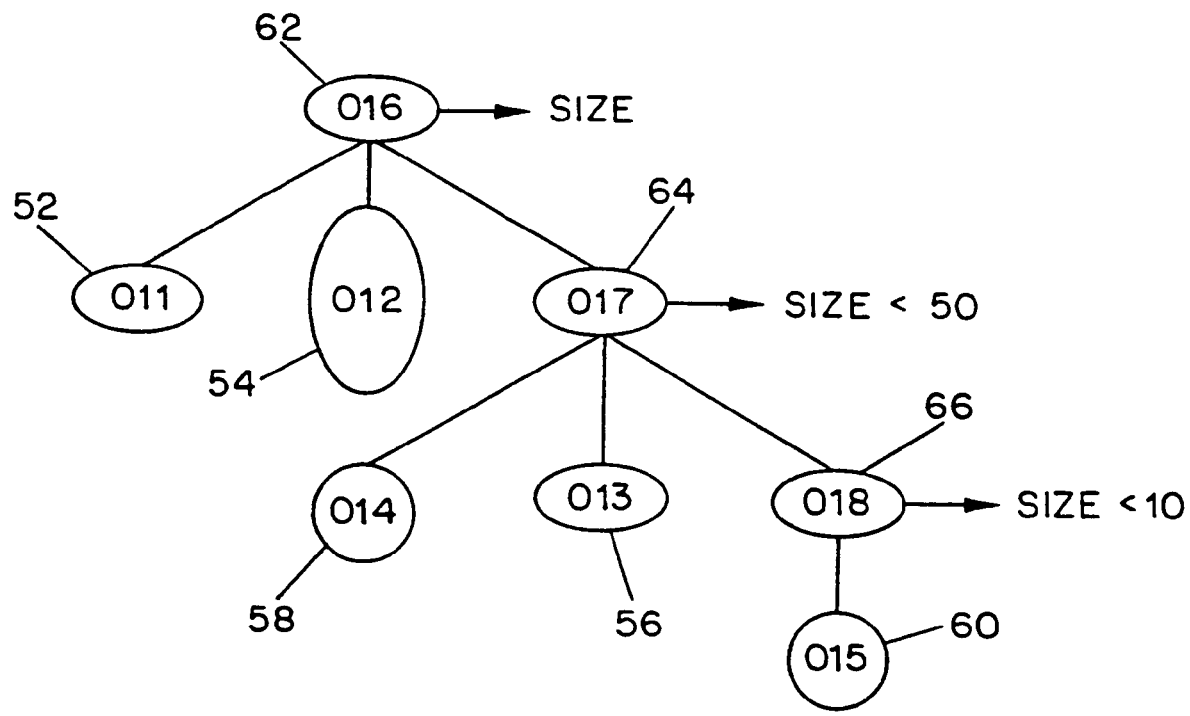
FIG. 4B is an exemplary clustering hierarchy for the image description system of the present invention.

FIGS. 4A and 4B depict an exemplary use of an clustering hierarchy scheme wherein objects are clustered hierarchically based on their respective size (<size>). In particular, FIG. 4A depicts a representation of a relatively large image, such as a satellite photograph image for example, wherein objects O11 52, O12 54, O13 56, O14 58 and O15 60 represent image objects of varying size, such as lakes on the earth's surface for example, contained in the large image. FIG. 4B represents an exemplary size-based clustering hierarchy for the objects depicted in FIG. 4A, wherein objects O11 52, O12 54, O13 56, O14 58 and O15 60 represent the objects depicted in FIG. 4A, and wherein additional objects O16 62, O17 64 and O18 56 represent objects which specify the size-based criteria for the cluster hierarchy depicted in FIG. 4B. In particular, objects O16 62, O17 64 and O18 56 may for example represent intermediate nodes 32 of an object hierarchy 26, which intermediate nodes are represented as image objects 30. These objects include the criteria, conditions and constraints related to the size feature used for grouping the objects together in the depicted cluster hierarchy. In the particular example depicted in FIG. 4B, objects O16 62, O17 64 and O18 56 are used to form an clustering hierarchy having three hierarchical levels based on size. Object O16 62 represents the size criteria which forms the clustering hierarchy. Object O17 64 represents a second level of size criteria of less than 50 units, wherein such units may represent pixels for example; object O18 56 represents a third level of size criteria of less than 10 units. Thus, as depicted in FIG. 4B, objects O11 52, O12 54, O13 56, O14 58 and O15 60 are each characterized as having a specified size of a certain number of units. Similarly, objects O13 56, O14 58 and O15 60 are each characterized as having a specified size of less than 50 units, and object O15 60 is characterized as having a specified size of less than 10 units.

Although FIGS. 4A and 413 depict an example of a single clustering hierarchy based on only a single set of criteria, namely size, multiple clustering hierarchies using different criteria involving multiple features may also be used for any image. For example, such clustering hierarchies may group together objects based on any combination of media, visual, and/or semantic features. This procedure is similar to the procedure used to cluster images together in visual information retrieval engines. Each object contained within the overall large image is assigned an image object 30 in the object set 24, and may also be assigned certain associated features such as media features 36, visual features 38 or semantic features 40. The intermediate nodes 32 of the object hierarchy 26 are represented as image objects 30, and also include the criteria, conditions and constraints related to one or more features used for grouping the objects together at that particular level. An image description may include any number of clustering hierarchies. The exemplary clustering hierarchy depicted in FIGS. 4A and 4B is expressed in an exemplary XML implementation below.

```
<image>
    <image_object_set>
        <image_object type="LOCAL" id="O11">
        <!-- Real objects of the image -->
            <size> <num_pixels> 120 </num_pixels> </size>
        </image_object> <!-- Others objects -->
        <image_object type="LOCAL" id="O17"> <!--Intermediate nodes in the hierarchy-->
            <size> <num_pixels> <less_than> 50 </less_than> </num_pixels> </size>
        </image_object> <!-- Others objects -->
    </image_object_set>
    <object_hierarchy>
        <object_node id="ON11" object_ref="O16">
            <object_node id="ON12" object_ref="O11" />
            <object_node id="ON13" object_ref="O12" />
            <object_node id="ON14" object_ref="O17">
                <object_node id="ON15" object_ref="O13" />
                <object_node id="ON16" object_ref="O14" />
                <object_node id="ON17" object_ref="O18">
                    <object_node id="ON18" object_ref="O15" />
                </object_node>
            </object_node>
        </object_node>
    </object_hierarchy>
</image>.
```

As depicted in the multiple clustering hierarchy example of FIGS. 4A and 4B, and as denoted in Table 3 below, there are defined three levels of abstraction based on the size of the objects depicted. This multi-level abstraction scheme provides a scalable method for retrieving and viewing objects in the image depicted in FIG. 4A. Such an approach can also be used to represent multiple abstraction levels based on other features, such as various semantic classes for example.

TABLE 3

Objects in Each Abstraction Level

| Abstraction Level | Objects |
|---|---|
| 1 | O11, O12 |
| 2 | O11, O12, O13, O14 |
| 3 | O11, O12, O13, O14, O15 |

Although such hierarchical structures are suitable for purposes of retrieving images, certain relationships among objects cannot adequately be expressed using such structures. Thus, as depicted in FIGS. 1C and 2, the image description system of the present invention also utilizes entity-relation (E-R) graphs 28 for the specification of more complex relationships among objects. An entity-relation graph 28 is a graph of one or more entity nodes 42 and the relationships among them. Table 4 below denotes several different exemplary types of such relationships, as well as specific examples of each.

TABLE 4

Examples of relation types and relations.

| Relation Type | Relations |
|---|---|
| Spatial | |
| Directional | Top Of, Bottom Of, Right Of, Left Of, Upper Left Of, Upper Right Of, Lower Left Of, Lower Right Of |
| Topological | Adjacent To, Neighboring To, Nearby, Within, Contain |
| Semantic | Relative Of, Belongs To, Part Of, Related To, Same As, Is A, Consist Of |

Entity-relation graphs can be of any general structure, and can also be customized for any particular application by utilizing various inheritance relationships. The exemplary entity-relation graph depicted in FIG. 1C describes an exemplary spatial relationship, namely "Left Of", and an exemplary semantic relationship, namely "Shaking Hands With", between objects O1 2 and O2 6 depicted in FIG. 1A.

As depicted in FIG. 2, the image description system of the present invention allows for the specification of zero or more entity-relation graphs 28 (<entity_relation_graph>). An entity-relation graph 28 includes one or more sets of entity-relation elements 34 (<entity_relation>), and also contains two optional attributes, namely a unique identifier ID and a string type to describe the binding expressed by the entity relation graph 28. Values for such types could for example be provided by a thesaurus. Each entity relation element 34 contains one relation element 44 (<relation>), and may also contain one or more entity node elements 42 (<entity_node>) and one or more entity-relation elements 34. The relation element 44 contains the specific relationship being described. Each entity node element 42 references an image object 30 in the image object set 24 via link 43, by utilizing an attribute, namely object_ref. Via link 43, image objects 30 also can reference back to the entity nodes 42 referencing the image objects 30 by utilizing an attribute (event_code_refs).

As depicted in the exemplary entity-relation graph 28 of FIG. 1C, the entity-relation graph 28 contains two entity relations 34 between object O1 2 ("Person A") and object O2

6 ("Person B"). The first such entity relation 34 describes the spatial relation 44 regarding how object O1 2 is positioned with respect to (i.e., to the "Left Of") object O2 6. The second such entity relation 34 depicted in FIG. 1C describes the semantic relation 44 of how object O1 2 is "Shaking Hand With" object O2 6. An exemplary XML implementation of the entity-relation graph example depicted in FIG. 1C is shown below:

```
<entity_relation_graph>
    <entity_relation> <!- Spatial. directional entity relation -->
        <relation type="SPATIAL.DIRECTIONAL"> Left
        Of</relation>
        <entity_node id="ETN1" object_ref="O1"/>
        <entity_node id="ETN2" object_ref="O2"/>
    </entity_relation>
    <entity_relation> <!- Semantic entity relation -->
        <relation type="SEMANTIC"> Shaking hands with </relation>
        <entity_node id="ETN3" object_ref="O2"/>
<entity_node id="ETN4" object_ref="O1"/>
    </entity_relation>
</entity_relation_graph>
```

For purposes of efficiency, entity-relation elements 34 may also include one or more other entity-relation elements 34, as depicted in FIG. 2. This allows the creation of efficient nested graphs of entity relationships, such as those utilized in the Synchronized Multimedia Integration Language (SMIL), which synchronizes different media documents by using a series of nested parallel sequential relationships.

An object hierarchy 26 is a particular type of entity-relation graph 28 and therefore can be implemented using an entity-relation graph 28, wherein entities are related by containment relationships. Containment relationships are topological relationships such as those denoted in Table 4. To illustrate that an object hierarchy 26 is a particular type of an entity-relation graph 28, the exemplary object hierarchy 26 depicted in FIG. 1B is expressed below in XML as an entity-relation graph 28.

```
<entity_relation_graph>
    <entity_relation>
        <relation type="SPATIAL"> Contain </relation>
        <entity_node object_ref="O0"/>
        <entity_node object_ref="O1"/>
    </entity_relation>
    <entity_relation>
        <relation type="SPATIAL"> Contain </relation>
        <entity_node object_ref="O0"/>
        <entity_node object_ref="O2"/>
    </entity_relation>
</entity_relation_graph>
```

The exemplary hierarchy depicted in FIG. 1B describes how object O0 8 (the overall photograph) spatially contains objects O1 2 ("Person A") and O2 6 ("Person B"). Thus, based on particular requirements, applications may implement hierarchies utilizing either the convenience of the comprehensive structure of an entity-relation graph 28, or alternatively by utilizing the efficiency of object hierarchies 26.

For image descriptors associated with any type of features, such as media features 36, visual features 38 or semantic features 40 for example, the image description system of the present invention may also contain links to extraction and similarity matching code in order to facilitate code downloading, as illustrated in the XML example below. These links provide a mechanism for efficient searching and filtering of image content from different sources using proprietary descriptors. Each image descriptor in the image description system of the present invention may include a descriptor value and a code element, which contain information regarding the extraction and similarity matching code for that particular descriptor. The code elements (<code>) may also include pointers to the executable files (<location>), as well as the description of the input parameters (<input_parameters>) and output parameters (<output_parameters>) for executing the code. Information about the type of code (namely, extraction code or similarity matching code), the code language (such as Java or C for example), and the code version are defined as particular attributes of the code element.

The exemplary XML implementation set forth below provides a description of a so-called Tamura texture feature, as set forth in H. Tamura, S. Mori, and T. Yamawaki, "Textual Features Corresponding to Visual Perception," IEEE Transactions on Systems, Man and Cybernetics, Vol. 8, No. 6, June 1978, the entire content of which is incorporated herein by reference. The Tamura texture feature provides the specific feature values (namely, coarseness, contrast, and directionality) and also links to external code for feature extraction and similarity matching. In the feature extraction example shown below, additional information about input and output parameters is also provided. Such a description could for example be generated by a search engine in response to a texture query from a meta search engine. The meta search engine could then use the code to extract the same feature descriptor from the results received from other search engines, in order to generate a homogeneous list of results for a user. In other cases, only the extraction and similarity matching code, but not the specific feature values, is included. If necessary in such instances, filtering agents may be used to extract feature values for processing.

The exemplary XML implementation shown below also illustrates the way in which the XML language enables externally defined description schemes for descriptors to be imported and combined into the image description system of the present invention. In the below example, an external descriptor for the Croma Key shape feature is imported into the image description by using XML namespaces. Using this framework, new features, types of features, and image descriptors can be conveniently included in an extensible and modular way.

```
<texture> <tamura>
    <tamura_value coarseness="0.01" contrast="0.39"
    directionality="0.7"/>
    <code type="EXTRACTION" language="JAVA" version="1.1">
<!-- Link extraction code -->
        <location> <location_site href="ftp://extract.tamura.java"/>
        </location>
        <input_parameters> <parameter name="image" type="PPM"/>
</input_parameters>
        <output_parameters>
            <parameter name="tamura texture" type="double[3]"/>
        </output_parameters>
    </code>
    <code type="DISTANCE" language="JAVA" version="4.2">
    <!-- Link similarity code -->
        <location> <location_site href="ftp://distance.tamura.java"/>
        </location>
    </code>
</tamura> </texture>
<shape> <!-- Import external shape descriptor DTD -->
    <chromaKeyShape xmlns:extShape
    "http://www.other.ds/chromaKeyShape.dtd">
        <extShape:HueRange>
            <extShape:start> 40 </extShape:start> <extShape:end> 40
```

```
    </extShape:end>
        </extShape:HueRange>
    </chromaKeyShape>
</shape>
```

The image description system of the present invention also supports modality transcoding. In an exemplary instance in which a content broadcaster must transmit image content to a variety of users, the broadcaster must transcode the image content into different media modalities and resolutions, in order to accommodate the users' various terminal requirements and bandwidth limitations. The image description system of the present invention provides modality transcoding in connection with both local and global objects. This modality transcoding transcodes the media modality, resolution, and location of transcoded versions of the image objects in question, or alternatively links to external transcoding code. The image descriptor in question also can point to code for transcoding an image object into different modalities and resolutions, in order to satisfy the requirements of different user terminals. The exemplary XML implementation shown below illustrates providing an audio transcoded version for an image object.

```
<image_object type="GLOBAL" id="O0">
    <img_obj_media_features>
        <location> <location_site href="Hi.gif"/> </location>
        <modality_transcoding>
            <modality_object_set>
                <modality_object id="mo2" type="AUDIO"
                resolution="1">
                    <location><location_site
href="Hi.au.xml"?o1/></location>
                </modality_object>
            </modality_object_set>
        </modality_transcoding>
    <img_obj_media_features>
</image_object>
```

Figure 5:
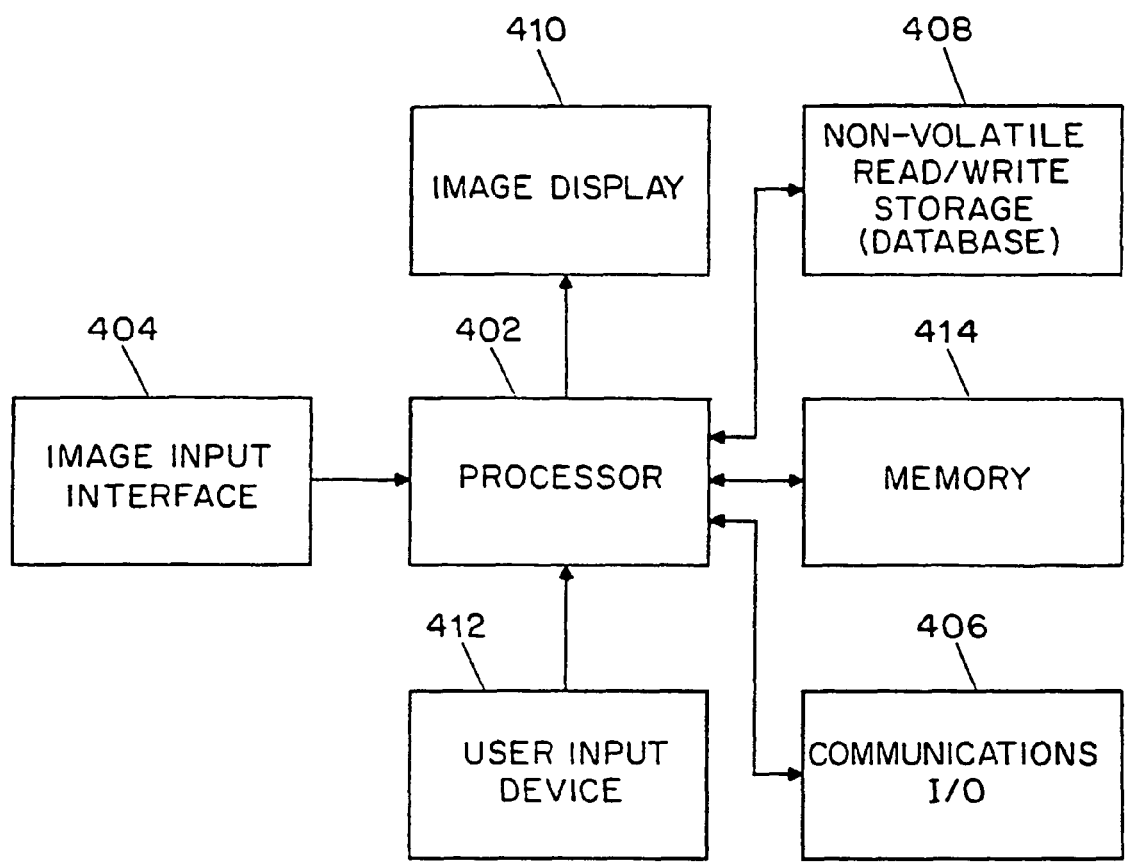
FIG. 5 is an exemplary block diagram of the image description system of the present invention.

FIG. 5 depicts a block diagram of an exemplary computer system for implementing the image description system of the present invention. The computer system depicted includes a computer processor section 402 which receives digital data representing image content, via image input interface 404 for example. Alternatively, the digital image data can be transferred to the processor section 402 from a remote source via a bidirectional communications input/output (I/O) port 406. The image content can also be transferred to the processor section 402 from non-volatile computer media 408, such as any of the optical data storage or magnetic storage systems well known in the art. The processor section 402 provides data to an image display system 410, which generally includes appropriate interface circuitry and a high resolution monitor, such as a standard SVGA monitor and video card which are commonly employed in conventional personal computer systems and workstations for example. A user input device, such as a keyboard and digital pointing device a mouse, trackball, light pen or touch screen for example), is coupled to the processor section 402 to effect the user's interaction with the computer system. The exemplary computer system of FIG. 5 will also normally include volatile and non volatile computer memory 414, which can be accessed by the processor section 402 during processing operations.

Figure 6:
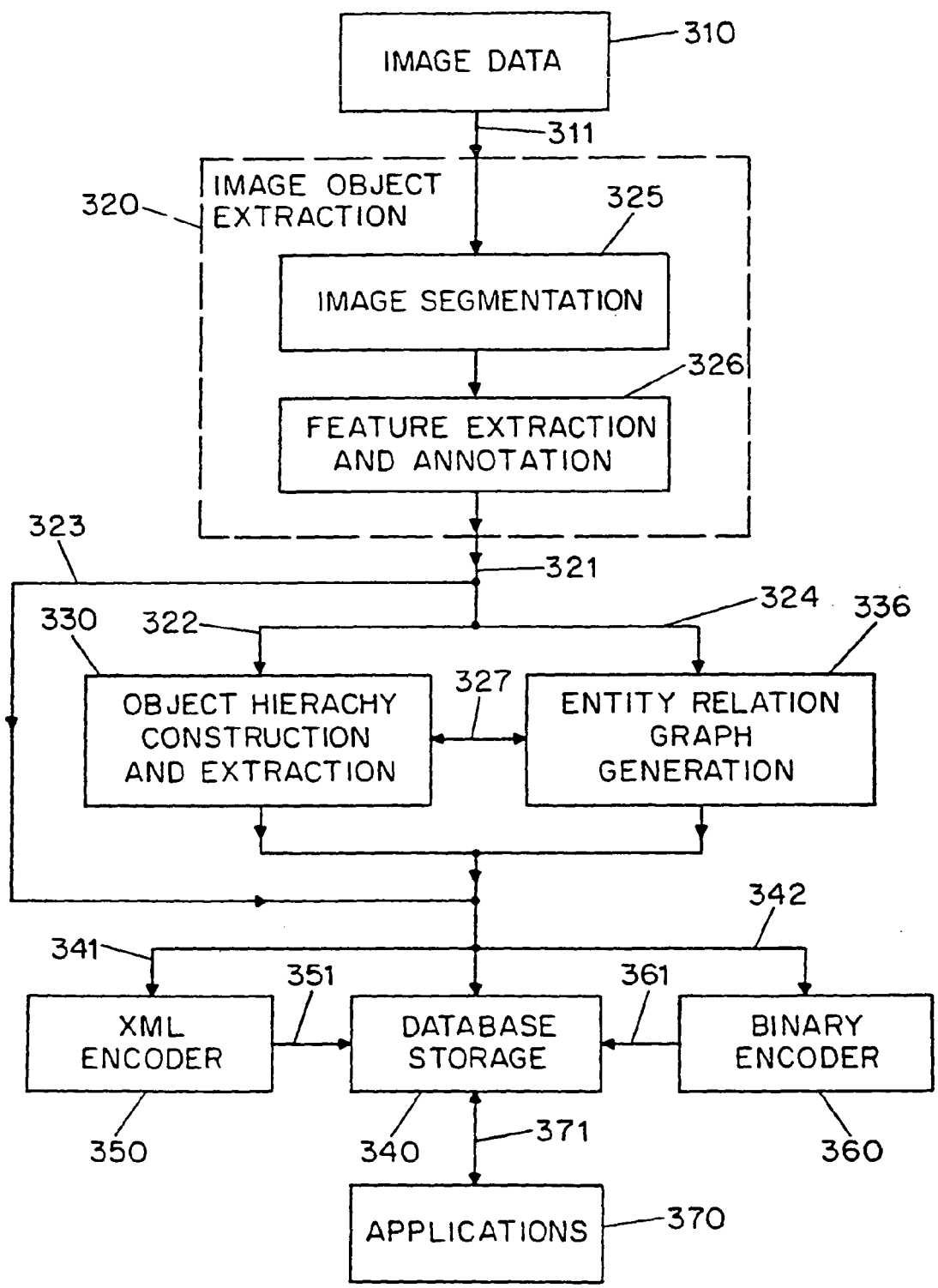
FIG. 6 is an exemplary process flow diagram for the image description system of the present invention.

FIG. 6 depicts a flows chart diagram which further illustrates the processing operations undertaken by the computer system depicted in FIG. 5 for purposes of implementing the image description system of the present invention. Digital image data 310 is applied to the computer system via link 311. The computer system, under the control of suitable application software, performs image object extraction in block 320, in which image objects 30 and associated features, such as media features 36, visual features 38 and semantic features 40 for example, are generated. Image object extraction 320 may take the form of a fully automatic processing operation, a semi-automatic processing operation, or a substantially manual operation in which objects are defined primarily through user interaction, such as via user input device 412 for example.

In a preferred embodiment, image object extraction 320 consists of two subsidiary operations, namely image segmentation as depicted by block 325, and feature extraction and annotation as depicted by block 326. For the image segmentation 325 step, any region tracking technique which partitions digital images into regions that share one or more common characteristics may be employed. Likewise, for the feature extraction and annotation step 326, any technique which generates features from segmented regions may be employed. A region-based clustering and searching subsystem is suitable for automated image segmentation and feature extraction. An image object segmentation system is an example of a semi-automated image segmentation and feature extraction system. Manual segmentation and feature extraction could alternatively be employed. In an exemplary system, image segmentation 325 may for example generate image objects 30, and feature extraction and annotation 326 may for example generate the features associated with the image objects 30, such as media features 36, visual features 38 and semantic features 40, for example.

The object extraction processing 320 generates an image object set 24, which contains one or more image objects 30. The image objects 30 of the image object set 24 may then be provided via links 321, 322 and 324 for further processing in the form of object hierarchy construction and extraction processing as depicted in block 330, and/or entity relation graph generation processing as depicted in block 336. Preferably, object hierarchy construction and extraction 330 and entity relation graph generation 336 take place in parallel and via link 327. Alternatively, image objects 30 of the image object set 24 may be directed to bypass object hierarchy construction and extraction 330 and entity relation graph generation 336, via link 323. The object hierarchy construction and extraction 330 thus generates one or more object hierarchies 26, and the entity relation graph generation 336 thus generates one or more entity relation graphs 28.

The processor section 402 then merges the image object set 24, object hierarchies 26 and entity relation graphs 28 into an image description record for the image content in question. The image description record may then be stored directly in database storage 340, or alternatively may first be subjected to compression by binary encoder 360 via links 342 and 361, or to encoding by description definition language encoding (using XML for example) by XML encoder 350 via links 341 and 351. Once the image description records have been stored in data base storage 340, they remain available in a useful format for access and use by other applications 370, such as search, filter and archiving applications for example, via bidirectional link 371.

Figure 7:
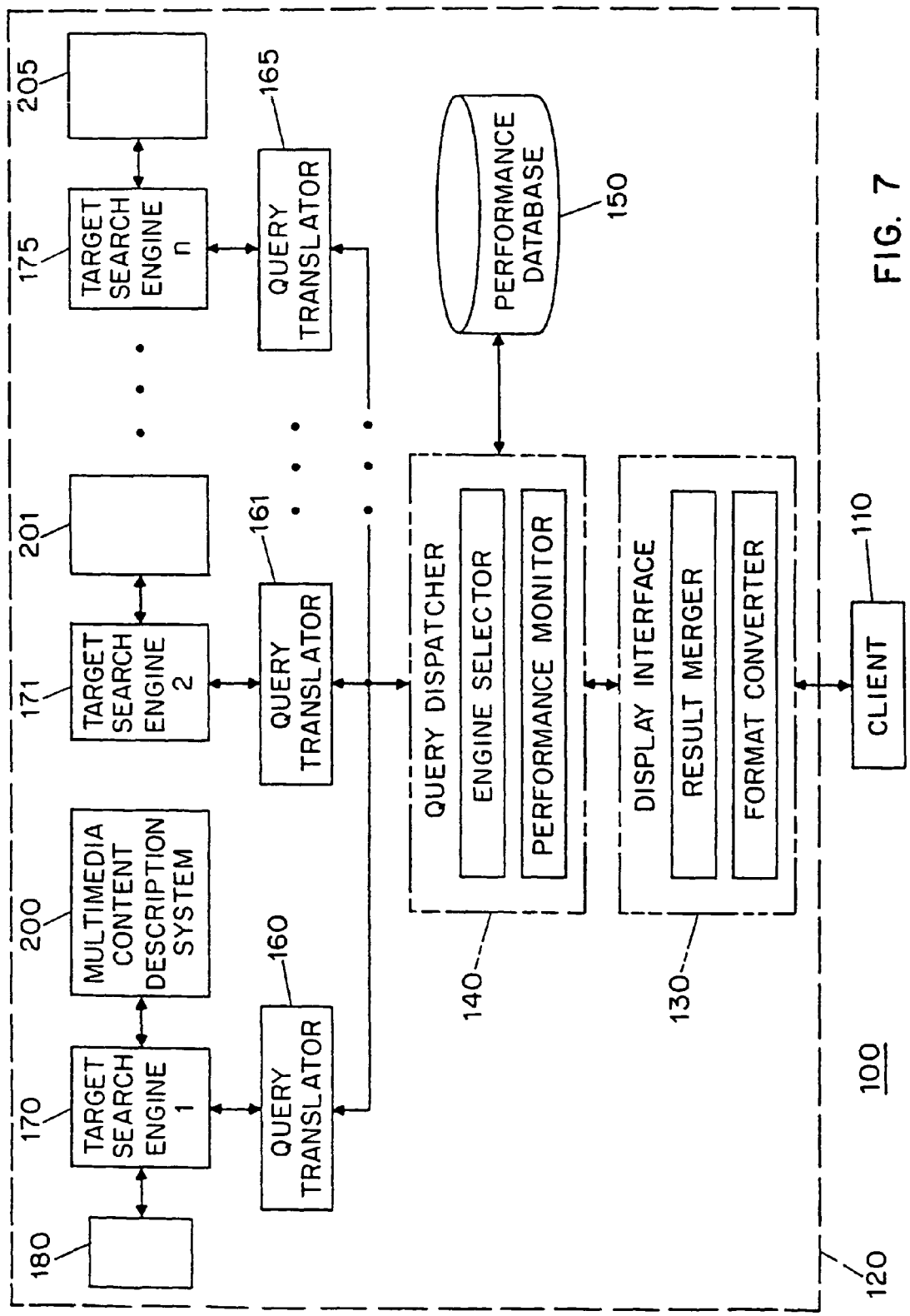
FIG. 7 is an exemplary block diagram of the image description system of the present invention.

Referring to FIG. 7, an exemplary embodiment of a client-server computer system on which the image description system of the present invention can be implemented is provided. The architecture of the system 100 includes a client computer 110 and a server computer 120. The server computer 120 includes a display interface 130, a query dispatcher 140, a performance database 150, query translators 160, 161, 165, target search engines 170, 171, 175, and multimedia content description systems 200, 201, 205, which will be described in further detail below.

While the following disclosure will make reference to this exemplary client-server embodiment, those skilled in the art should understand that the particular system arrangement may be modified within the scope of the invention to include numerous well-known local or distributed architectures. For example, all functionality of the client-server system could be included within a single computer, or a plurality of server computers could be utilized with shared or separated functionality.

Commercially available metasearch engines act as gateways linking users automatically and transparently to multiple text-based search engines. The system of FIG. 7 grows upon the architecture of such metasearch engines and is designed to intelligently select and interface with multiple on-line multimedia search engines by ranking their performance for different classes of user queries. Accordingly, the query dispatcher 140, query translators 160, 161, 165, and display interface 130 of commercially available metasearch engines may be employed in, the present invention.

The dispatcher 140 selects the target search engines to be queried by consulting the performance database 150 upon receiving a user query. This database 150 contains performance scores of past query successes and failures for each supported search option. The query dispatcher only selects search engines 170, 171, 175 that are able to satisfy the user's query, e.g. a query seeking color information will trigger color enabled search engines. Search engines 170, 171, 175 may for example be arranged in a client-server relationship, such as search engine 170 and associated client 172.

The query translators 160, 161, 165, translate the user query to suitable scripts conforming to the interfaces of the selected search engines. The display component 130 uses the performance scores to merge the results from each search engine, and presents them to the user.

In accordance with the present invention, in order to permit a user to intelligently search the Internet or a regional or local network for visual content, search queries may be made either by descriptions of multimedia content generated by the present invention, or by example or sketch. Each search engine 170, 171, 175 employs a description scheme, for example the description schemes described below, to describe the contents of multimedia information accessible by the search engine and to implement the search.

In order to implement a content-based search query for multimedia information, the dispatcher 140 will match the query description, through the multimedia content description system 200, employed by each search engine 170, 171, 175 to ensure the satisfaction of the user preferences in the query. It will then select the target search engines 170, 171, 175 to be queried by consulting the performance database 150. If for example the user wants to search by color and one search engine does not support any color descriptors, it will not be useful to query that particular search engine.

Next, the query translators 160, 161, 165 will adapt the query description to descriptions conforming to each selected search engine. This translation will also be based on the description schemes available from each search engine. This task may require executing extraction code for standard descriptors or downloaded extraction code from specific search engines to transform descriptors. For example, if the user specifies the color feature of an object using a color coherence of 166 bins, the query translator will translate it to the specific color descriptors used by each search engine, e.g. color coherence and color histogram of x bins.

Before displaying the results to the user, the query interface will merge the results from each search option by translating all the result descriptions into a homogeneous one for comparison and ranking. Again, similarity code for standard descriptors or downloaded similarity code from search engines may need to be executed. User preferences will determine how the results are displayed to the user.

Figure 8:
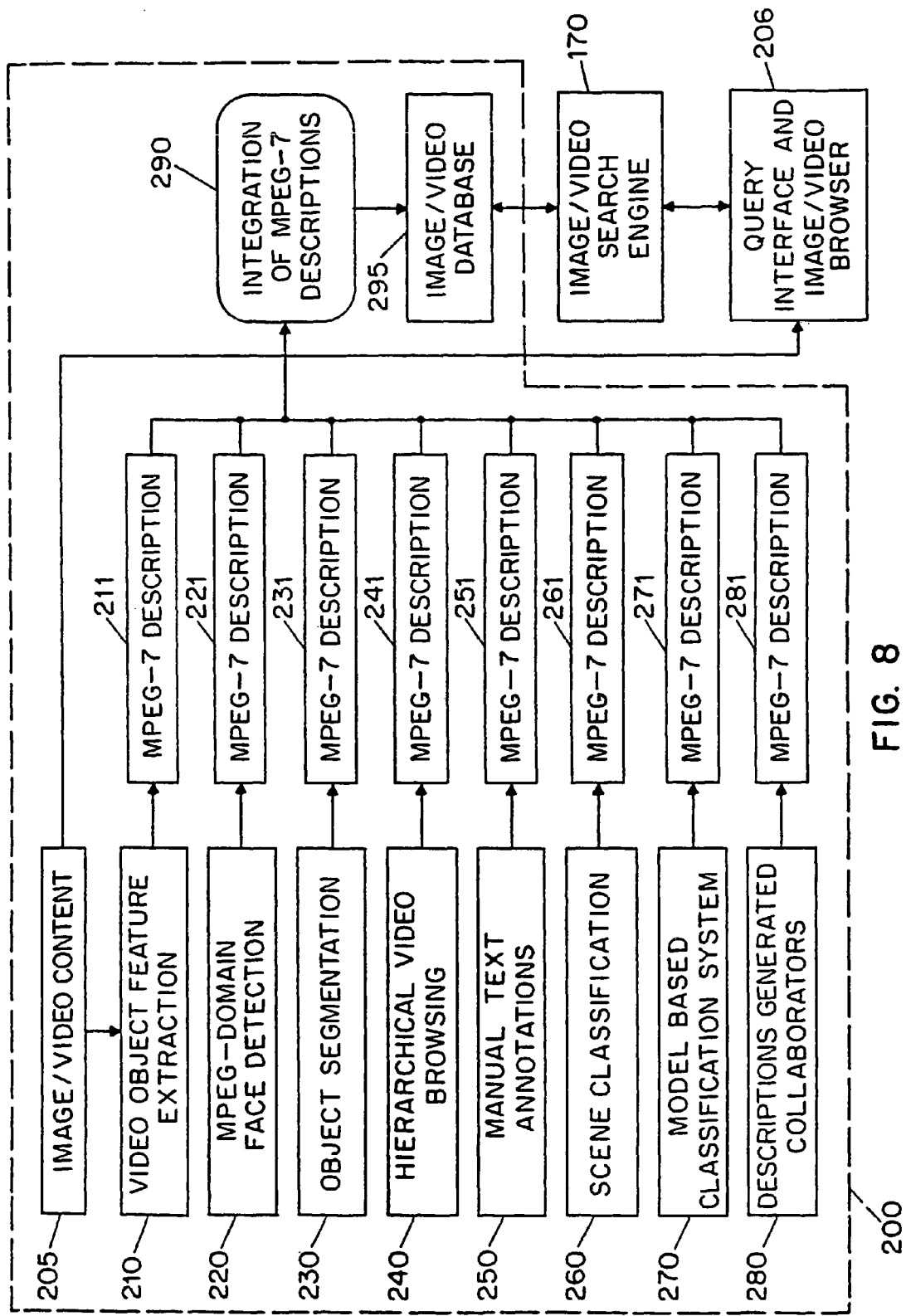
FIG. 8 is an another exemplary block diagram of the image description system of the present invention.

Referring next to FIG. 8, a description system 200 which, in accordance with the present invention, is employed by each search engine 170, 171, 175 is now described. In the preferred embodiment disclosed herein, XML is used to describe multimedia content.

The description system 200 advantageously includes several multimedia processing, analysis and annotation sub-systems 210, 220, 230, 240, 250, 260, 270, 280 to generate a rich variety of descriptions for a collection of multimedia items 205. Each subsystem is described in turn.

The first subsystem 210 is a region-based clustering and searching system which extracts visual features such as color, texture, motion, shape, and size for automatically segmented regions of a video sequence. The system 210 decomposes video into separate shots by scene change detection, which may be either abrupt or transitional (e.g. dissolve, fade in/out, wipe). For each shot, the system 210 estimates both global motion (i.e. the motion of dominant background) and camera motion, and then segments, detects, and tracks regions across the frames in the shot computing different visual features for each region. For each shot, the description generated by this system is a set of regions with visual and motion features, and the camera motion. A complete description of the region-based clustering and searching system 210 is contained in co-pending PCT Application Serial No. PCT/US98/09124, filed May 5, 1998, entitled "An Algorithm and System. Architecture for Object-Oriented Content-Based Video Search," the contents of which are incorporated by reference herein.

As used herein, a "video clip" shall refer to a sequence of frames of video information having one or more video objects having identifiable attributes, such as, by way of example and not of limitation, a baseball player swinging a bat, a surfboard moving across the ocean, or a horse running across a prairie. A "video object" is a contiguous set of pixels that is homogeneous in one or more features of interest, e.g., texture, color, motion or shape. Thus, a video object is formed by one or more video regions which exhibit consistency in at least one feature. For example a shot of a person (the person is the "object" here) walking would be segmented into a collection of adjoining regions differing in criteria such as shape, color and texture, but all the regions may exhibit consistency in their motion attribute.

The second subsystem 220 is an MPEG domain face detection system, which efficiently and automatically detects faces directly in the MPEG compressed domain. The human face is an important subject in images and video. It is ubiquitous in news, documentaries, movies, etc., providing key information to the viewer for the understanding of the video content. This system provides a set of regions with face labels. A complete description of the system 220 is contained in PCT Application Serial No. PCT/US 97/20024, filed Nov. 4, 1997, entitled "A Highly Efficient System for Automatic Face Region Detection in MPEG Video," the contents of which are incorporated by reference herein.

The third subsystem 230 is a video object segmentation system in which automatic segmentation is integrated with user input to track semantic objects in video sequences. For general video sources, the system allows users to define an approximate object boundary by using a tracing interface. Given the approximate object boundary, the system automatically refines the boundary and tracks the movement of the object in subsequent frames of the video. The system is robust enough to handle many real-world situations that are difficult to model using existing approaches, including complex objects, fast and intermittent motion, complicated backgrounds, multiple moving objects and partial occlusion. The description generated by this system is a set of semantic objects with the associated regions and features that can be manually annotated with text. A complete description of the system 230 is contained in U.S. patent application Ser. No. 09/405,555, filed Sep. 24, 1998, entitled "An Active System and Algorithm for Semantic Video Object Segmentation," the contents of which are incorporated by reference herein.

The fourth subsystem 240 is a hierarchical video browsing system that parses compressed MPEG video streams to extract shot boundaries, moving objects, object features, and camera motion. It also generates a hierarchical shot-based browsing interface for intuitive visualization and editing of videos. A complete description of the system 240 is contained in PCT Application Serial No. PCT/US 97/08266, filed May 16, 1997, entitled "Efficient Query and Indexing Methods for Joint Spatial/Feature Based Image Search," the contents of which is incorporated by reference herein.

The fifth subsystem 250 is the entry of manual text annotations. It is often desirable to integrate visual features and textual features for scene classification. For images from on-line news sources, e.g. Clarinet, there is often textual information in the form of captions or articles associated with each image. This textual information can be included in the descriptions.

The sixth subsystem 260 is a system for high-level semantic classification of images and video shots based on low-level visual features. The core of the system consists of various machine learning techniques such as rule induction, clustering and nearest neighbor classification. The system is being used to classify images and video scenes into high level semantic scene classes such as {nature landscape}, {city/suburb}, {indoor}, and {outdoor}. The system focuses on machine learning techniques because we have found that the fixed set of rules that might work well with one corpus may not work well with another corpus, even for the same set of semantic scene classes. Since the core of the system is based on machine learning techniques, the system can be adapted to achieve high performance for different corpora by training the system with examples from each corpus. The description generated by this system is a set of text annotations to indicate the scene class for each image or each keyframe associated with the shots of a video sequence. A complete description of the system 260 is contained in S. Paek et al. "Integration of Visual and Text based Approaches for the Content Labeling and Classification of Photographs," ACM SIGIR '99 Workshop on Multimedia Indexing and Retrieval. Berkeley, C A (1999), the contents of which are incorporated by reference herein.

The seventh subsystem 270 is model based image classification system. Many automatic image classification systems are based on a pre-defined set of classes in which class-specific algorithms are used to perform classification. The system 270 allows users to define their own classes and provide examples that are used to automatically learn visual models. The visual models are based on automatically segmented regions, their associated visual features, and their spatial relationships. For example, the user may build a visual model of a portrait in which one person wearing a blue suit is seated on a brown sofa, and a second person is standing to the right of the seated person. The system uses a combination of lazy-learning, decision trees and evolution programs during classification. The description generated by this system is a set of text annotations, i.e. the user defined classes, for each image. A complete description of the system 270 is contained in PCT Application Serial No. PCT/US 97/08266, filed May 16, 1997, entitled "A Method and Architecture for Indexing and Editing Compressed Video Over the World Wide Web," the contents of which are incorporated by reference herein.

Other subsystems 280 may be added to the multimedia content description system 200, such as a subsystems from collaborators used to generate descriptions or parts of descriptions, for example.

In operation, the image and video content 205 may be a database of still images or moving video, a buffer receiving content from a browser interface 206, or a receptacle for live image or video transmission. The subsystems 210, 220, 230, 240, 250, 260, 270, 280 operate on the image and video content 205 to generate descriptions 211, 221, 231, 241, 251, 261, 271, 281 that include low level visual features of automatically segmented regions, user defined semantic objects, high level scene properties, classifications and associated textual information, as described above. Once all the descriptions for an image or video item are generated and integrated in block 290, the descriptions are then input into a database 295, which the search engine 170 accesses.

It should be noted that certain of the subsystems, i.e., the region-based clustering and searching subsystem 210 and the video object segmentation system 230 may implement the entire description generation process, while the remaining subsystems implement only portions of the process and may be called on by the subsystems 210, 230 during processing. In a similar manner, the subsystems 210 and 230 may be called on by each other for specific tasks in the process.

In FIGS. 1-6, systems and methods for describing image content are described. These techniques are readily extensible to video content as well. The performance of systems for searching and processing video content information can benefit from the creation and adoption of a standard by which such video content can be thoroughly and efficiently described. As used herein, the term "video clip" refers to an arbitrary duration of video content, such as a sequence of frames of video information. The term description scheme refers to the data structure or organization used to describe the video content. The term description record refers to the description scheme wherein the data fields of the data structure are defined by data which describes the content of a particular video clip.

Figure 9:
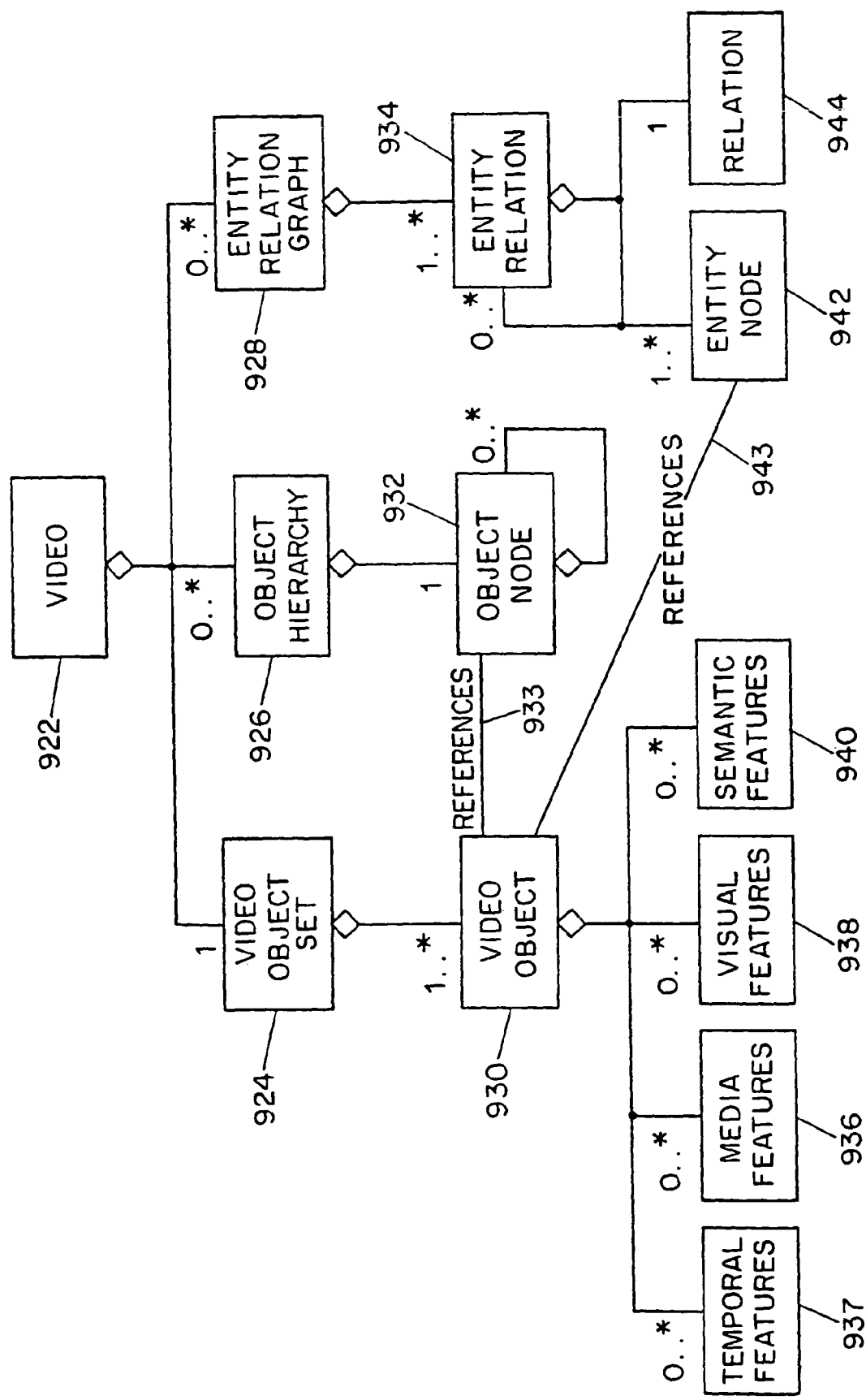
FIG. 9 is a schematic diagram of a video description scheme (DS), in accordance with the present invention.

Referring to FIG. 9, an exemplary embodiment of the present video description scheme (DS) is illustrated in schematic form. The video DS inherits all of the elements of the image description scheme and adds temporal elements thereto, which are particular to video content. Thus, a video element 922 which represents a video description, generally includes a video object set 924, an object hierarchy definition 926 and entity relation graphs 928, all of which are similar to those described in connection with FIG. 2. An exemplary video DS definition is illustrated below in Table 5.

TABLE 5

Elements in the Video Description Scheme (DS).

| Element | Contains | May be Contained in |
|---|---|---|
| video | video_object_set (1)<br>object_hierarchy[1] (0..*)<br>entity_relation_graph[1] (0..*) | (root element) |
| video_object_set | video_object (1..*) | video |
| video_object | vid_obj_media_features (0..1)<br>vid_obj_semantic_features (0..1)<br>vid_obj_visual_features (0..1)<br>vid_obj_temporal_features (0..1) | object_set[1] |
| vid_obj_media_features | location[1] (0..1)<br>file_format[1] (0..1)<br>file_size[1] (0..1)<br>resolution[1] (0..1)<br>modality_transcoding[1] (0..1)<br>bit_rate (0..1) | video_object |
| vid_obj_semantic_features | text_annotation[1] (0..1)<br>who, what_object, what_action, when, where, why (0..1) | video_object |
| vid_obj_visual_features & type="LOCAL" | image_scl[1] (0..1)<br>color[1] (0..1)<br>texture[1] (0..1)<br>shape[1] (0..1)<br>size[1] (0..1)<br>position[1] (0..1)<br>motion (0..1) | video_object |
| vid_obj_visual_features & (type="SEGMENT" \| type="GLOBAL") | video_scl (0..1)<br>visual_sprite (0..1)<br>transition (0..1)<br>camera_motion (0..1)<br>size (0..1)<br>key_frame (0..*) | video_object |
| vid_obj_visual_features | time (0..1) | video_object |
| object_hierarchy[1] | object_node[1] (1) | video |
| object_node[1] | object_node[1] (0..*) | object_hierarchy[1]<br>object_node[1] |
| entity_relation_graph[1] | entity_relation[1] (1..*) | Video |
| entity_relation[1]. | relation[1] (1)<br>entity_node[1] (1..*)<br>entity_relation[1] (0..*) | Entity_relation_graph[1]<br>Entity_realtion[1] |

[1]Defined in the Image DTD7

A basic element of the present video description scheme (DS) is the video object (<video_object>) 930. A video object 930 refers to one or more arbitrary regions in one or more frames of a video clip. For example, and not by way of limitation, a video object may be defined as local objects, segment objects and global objects. Local objects refer to a group of pixels found in one or more frames. Segment objects refer to one or more related frames of the video clip. Global objects refer to the entire video clip.

A video object 930 is an element of the video object, set 924 and can be related to other objects in the object set 924 by the object hierarchy 926 and entity relation graphs 928 in the same manner as described in connection with FIGS. 1-6. Again, the fundamental difference between the video description scheme and the previously described image description scheme resides in the inclusion of temporal parameters which will further define the video objects and their interrelation in the description scheme.

In using XML to implement the present video description scheme, to indicate if a video object has associated semantic information, the video object can include a "semantic" attribute which can take on an indicative value, such as true or false. To indicate if the object has associated physical information (such as color, shape, time, motion and position), the object can include an optional "physical" attribute that can take on an indicative value, such as true or false. To indicate whether regions of an object are spatially adjacent to one another (continuous in space), the object can include an optional "spaceContinuous" attribute that can assume a value such as true or false. To indicate if the video frames which contain a particular object are temporally adjacent to one another (continuous in time), the object can further include an optional "timeContinuous" attribute. This attribute can assume an indicative value, such as true or false. To distinguish if the object refers to a region within select frames of a video, to entire frames of the video, or to the entire video commonly (e.g. shots, scenes, stories), the object will generally include an attribute (type), that can have multiple indicative values such as, LOCAL, SEGMENT, and GLOBAL, respectively.

Figure 10:
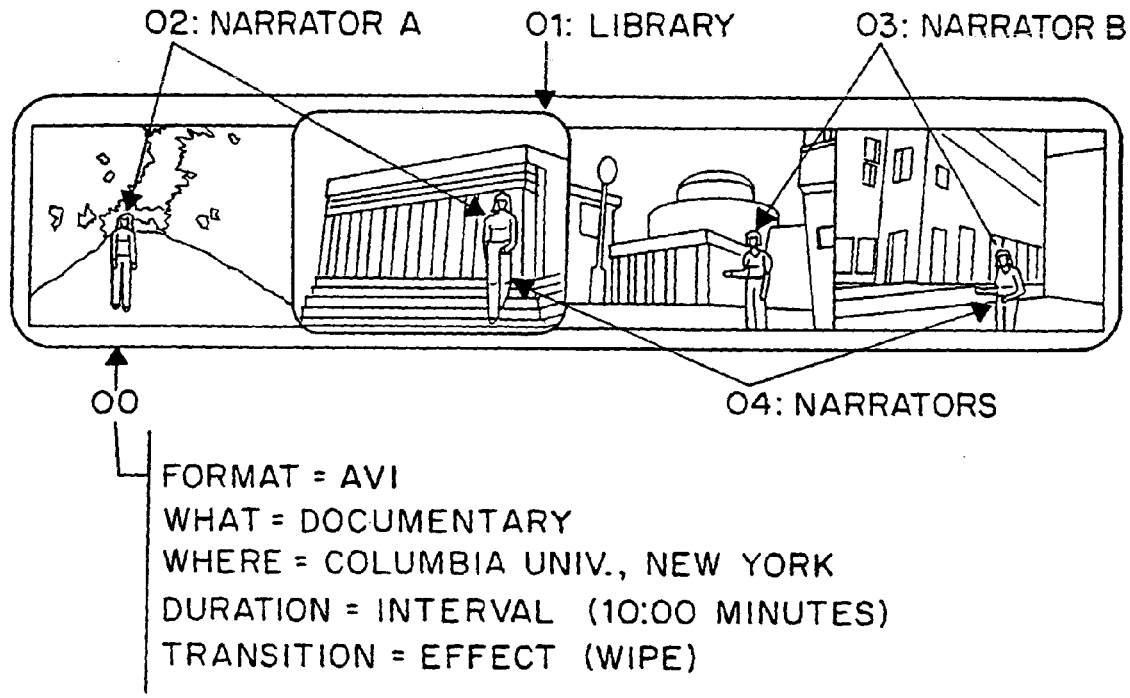
FIG. 10 is a pictorial diagram of an exemplary video clip, with a plurality of objects defined therein.

FIG. 10 is a pictorial diagram which depicts a video clip from a video clip wherein a number of exemplary objects are identified. Object O0, is a global object which refers to the entire video clip. Object O1, the library, refers to an entire frame of video and would be classified as a segment type object. Objects O2 and O3 are local objects which refer to narrator A and narrator B, respectively, which are person objects that are continuous in time and space. Object O4 ("Narrators") are local video objects (O2, O3) which is discontinuous in space. FIG. 10 further illustrates that objects can be nested. For example, object O1, the library, includes local object O2, and both of these objects are contained within the global object O0. An XML description of the objects defined in FIG. 10 is set forth below.

```
<video_object_set>
    <video_object id="O0" type="GLOBAL"> <video_object>
    <!--Documentary -->
    <video_object id="O1" type="SEGMENT"> </video_object>
    <!--Library -->
    <video_object id="O2" type="LOCAL"> </video_object>
    <!-- Narrator A -->
    <video_object id="O3" type="LOCAL"> </video_object>
    <!--Narrator B -->
    <video_object id="O4" type="LOCAL"> </video_object>
    <!--Narrators -->
</image_object_set>
```

Figure 11:
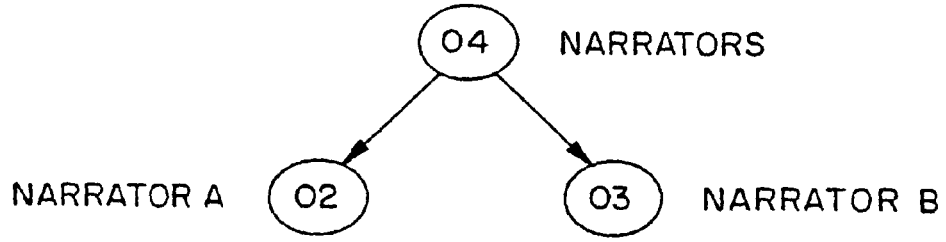
FIG. 11 is a graphical representation of an exemplary semantic hierarchy illustrating exemplary relationships among objects in the video clip of FIG. 10.

FIG. 11 illustrates how two or more video objects are related through the object hierarchy 926. In this case, objects O2 and O3 have a common semantic feature of "what object" being a narrator. Thus, these objects can be referenced in the definition of a new object, O4, narrators, via an object hierarchy definition. The details of such hierarchical definition follow that described in connection with FIG. 3A.

Figure 12:
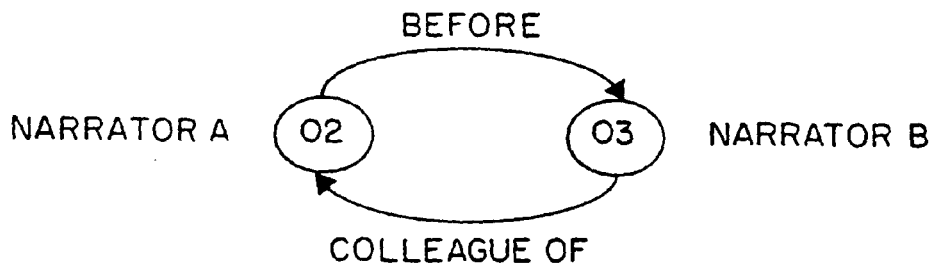
FIG. 12 is a graphical representation of an entity relation graph illustrating exemplary relationships among objects in the video clip of FIG. 10.

FIG. 12 illustrates how the entity relation graph in the video description scheme can relate video objects in this case, two relationships are shown, between objects O2 and O3. The first is a semantic relationship, "colleague of", which is equivalent to the type of semantic relationship which could be present in the case of the image description scheme, as described in connection with FIG. 1C. FIG. 12 further shows a temporal relationship between the objects O2 and O3. In this case, object O2 precedes object O3 in time within the video clip, thus the temporal relationship "before" can be applied. In addition to the exemplary relation types and relations set forth in connection with the image description scheme, the video description scheme can employ the relation types and relations set forth in the table below.

| RELATION TYPE | RELATIONS |
| --- | --- |
| TEMPORAL-Directional | Before, After, Immediately Before, Immediately After |
| TEMPORAL-Topological | Co-Begin, Co-End, Parallel, Sequential, Overlap, Within, Contain, Nearby |

The video objects 930 can be further characterized in terms of object features. Although any number and type of features can be defined to characterize the video objects in a modular and extensible manner, a useful exemplary feature set can include semantic features 940, visual features 938, media features 936 and temporal features 937. Each feature can then be further defined by feature parameters, or descriptors. Such descriptors will generally follow that described in connection with the image description scheme, with the addition of requisite temporal information. For example, visual features 938 can include a set of descriptors such as shape, color, texture, and position, as well as motion parameters. Temporal features 937 will generally include such descriptors as start time, end time and duration. Table 6 shows examples of descriptors, in addition to those set forth in connection with the image description scheme, that can belong to each of these exemplary classes of features,

TABLE 6

Feature classes and features.

| Feature Class | Features |
| --- | --- |
| Visual | Motion, Editing effect, Camera Motion |
| Temporal | Start Time, End Time, Duration |

In summary, in a fashion analogous to the previously described image description scheme, the present video description scheme includes a video object set 924, an object hierarchy 926, and entity relation graphs 928. Video objects 930 are further defined by features. The objects 930 within the object set 924 can be related hierarchically by one or more object hierarchy nodes 932 and references 933. Relations between objects 930 can also be expressed in entity relation graphs 928, which further include entity relations 934, entity nodes 942, references 943 and relations 944, all of which substantially correspond in the manner described in connection with FIG. 2. Each video object 930 preferably includes features that can link to external extraction and similarity matching code.

Figure 13:
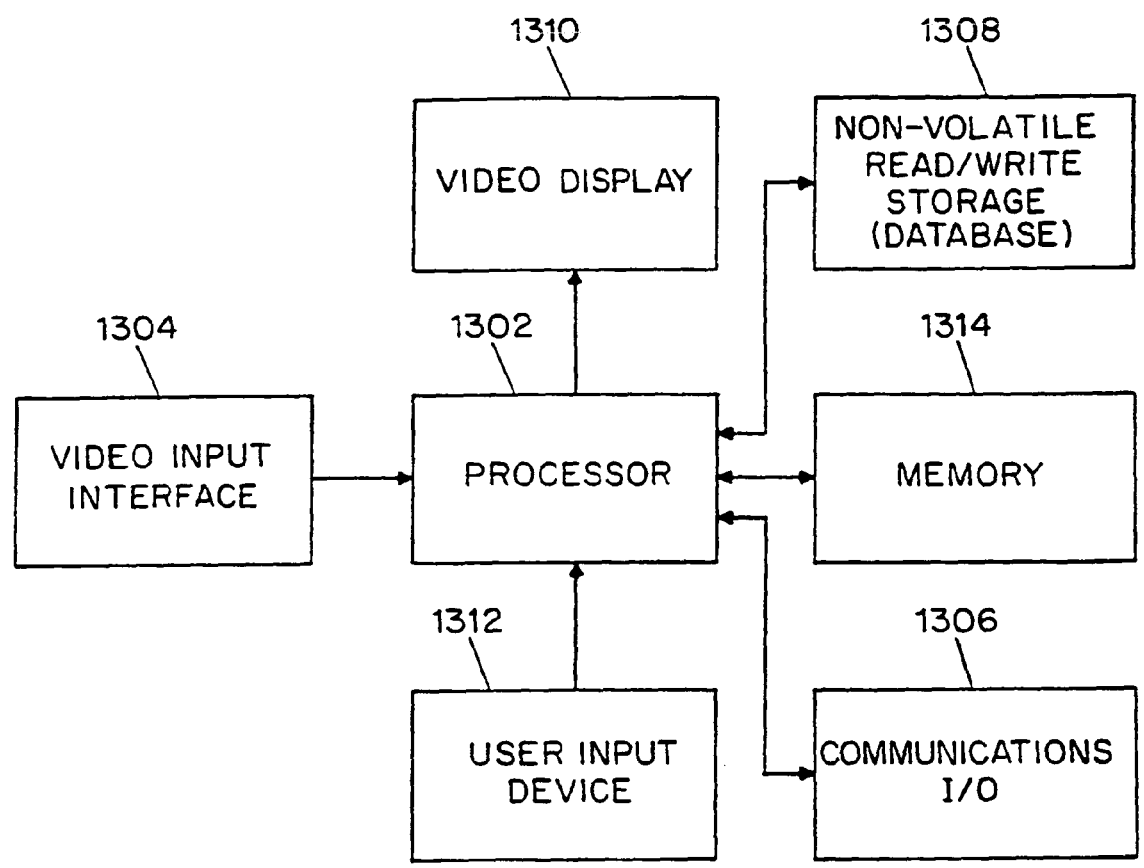
FIG. 13 is a block diagram of a system for creating video content descriptions in accordance with the present invention.

FIG. 13 is a block diagram of an exemplary computer system for implementing the present video description systems and methods, which is analogous to the system described in connection with FIG. 5. The system includes a computer processor section 1302 which receives digital data representing video content, such as via video input interface 1304. Alternatively, the digital video data can be transferred to the processor from a remote source via a bidirectional communications input/output port 1306. The video content can also be transferred to the processor section 1302 from computer accessible media 1308, such as optical data storage systems or magnetic storage systems which are known in the art. The processor section 1302 provides data to a video display system 1310, which generally includes appropriate interface circuitry and a high resolution monitor, such as a standard SVGA monitor and video card commonly employed in conventional personal computer systems and workstations. A user input device 1312, such as a keyboard and digital pointing device, such as a mouse, trackball, light pen, touch screen and the like, is operatively coupled to the processor section 1302 to effect user interaction with the system. The system will also generally include volatile and non volatile computer memory 1314 which can be accessed by the processor section during processing operations.

Figure 14:
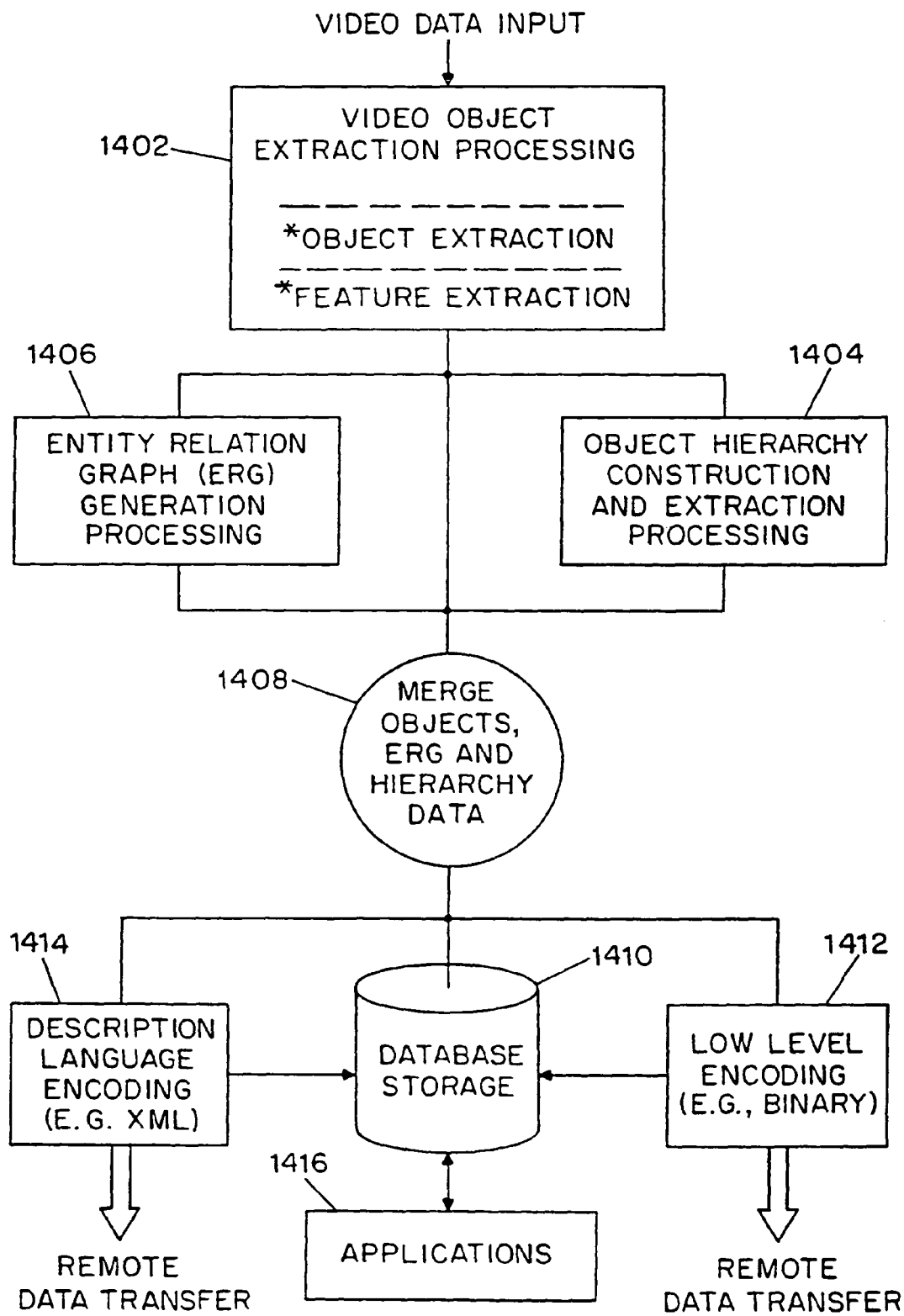
FIG. 14 is a flow diagram illustrating the processing operations involved in creating video content description records in accordance with the present invention.

FIG. 14 is a flow diagram which generally illustrates the processing operations undertaken by processor section 1302 in establishing the video DS described in connection with FIGS. 9-12. Digital data representing a video clip is applied to the system, such as via video input interface 1304 and is coupled to the processor section 1302. The processor section 1302, under the control of suitable software, performs video object extraction processing 1402 wherein video objects 930, features 936, 937, 938, 940 and the associated descriptors are generated. Video object extraction processing 1402 can take the form of a fully automatic processing operation, a semi-automatic processing operation, or a substantially manual operation where objects are largely defined through user interaction via the user input device 1312.

The result of object extraction processing is the generation of an object set 924, which contains one or more video objects 930 and associated object features 936, 937, 938, 940. The video objects 930 of the object set 924 are subjected to further processing in the form of object hierarchy construction and extraction processing 1404 and entity relation graph generation processing 1406. Preferably, these processing operations take place in a parallel fashion. The output result from object hierarchy construction and extraction processing 1404 is an object hierarchy 926. The output result of entity relation graph generation processing 506 is one or more entity relation graphs 928. The processor section 1302 combines the object set, object hierarchy and entity relation graphs into a description record in accordance with the present video description scheme for the applied video content. The description record can be stored in database storage 1410, subjected to low-level encoding 1412 (such as binary coding) or subjected to description language encoding (e.g. XML) 1414. Once the description records are stored in the read/write storage 1308 in the form of a database, the data is available in a useful format for use by other applications 1416, such as search, filter, archiving applications and the like.

Exemplary Document Type Definition of Video Description Scheme

This section discusses one embodiment wherein XML has been used to implement a document type definition (DTD) of the present video description scheme. Table 1, set forth above, summarizes the DTD of the present video DS. Appendix A includes the full listing of the DTD of the video DS. In general, a Document Type Definition (DTD) provides a list of the elements, tags, attributes, and entities contained in the document, and their relationships to each other. In other words, DTDs specify a set of rules for the structure of a document. DTDs may be included in a computer data file that contains the document they describe, or they may be linked to or from an external universal resource location (URL). Such external DTDs can be shared by different documents and Web sites. A DTD is generally included in a document's prolog after the XML declaration and before the actual document data begins.

Every tag used in a valid XML document must be declared exactly once in the DTD with an element type declaration. The first element in a DTD is the root tag. In our video DS, the root tag can be designated as <video> tag. An element type declaration specifies the name of a tag, the allowed children of the tag, and whether the tag is empty. The root <video> tag can be defined, as follows:

<!ELEMENT video (video_object_set, object_hierarchy*, entity_relation_graph*)> where the asterisk (*) indicates zero or more occurrences. In XML syntax, the plus sign (+) indicates one or more occurrences and the question mark (?) indicates zero or one occurrence.

In XML, all element type declarations start with <!ELEMENT and end with >. They include the name of the tag being declared video and the allowed contents (video_object_set, object_hierarchy*, entity_relation_graph*). This declaration indicates that a video element must contain a video object set element (<video_object_set>), zero or more object hierarchy elements (<object_hierarchy>), and zero or more entity relation graph elements (<entity_relation_graph>).

The video object set 924 can be defined as follows.

```
<!-- Video object set element -->
<!-- An object set consists of one or more video objects -->
<!ELEMENT video_object_set (video_object+)>
<!-- Video object element -->
<!-- Video object elements consist of the following elements:
    optional vid_obj_media_features element
    optional vid_obj_semantic_features element
    optional vid_obj_visual_features element
    optional vid_obj_temporal_features element -->
<!ELEMENT video_object (vid_obj_media_features?,
vid_obj_semantic_features?,
            vid_obj_visual_features?,
vid_obj_temporal_features?)>
    <!-- Video object elements must have a unique ID attribute in each description -->
    <!ATTLIST video_object
        type (LOCAL|SEGMENT|GLOBAL) #REQUIRED
        id ID #IMPLIED
        object_ref IDREF #IMPLIED
        object_node_ref IDREFS #IMPLIED
        entity_node_ref IDREFS #IMPLIED>
    <!-- Feature elements: media, semantic, temporal and visual -->
    <!-- Video object media features element consists an optional location,
    file_format, file_size, resolution, modality_transcoding, and bit_rate elements -->
    <!ELEMENT vid_obj_media_features (location?, file_format?, file_size?,
    resolution?,
                modality_transcoding?, bit_rate?)>
    <!-- Video object semantic features element consists an optional text_annotation and
    the 6-W elements -->
    <!ELEMENT vid_obj_semantic_features (text_annotation?, who?, what_action?,
                where?, why?, when?)>
<!-- Video object visual features element consists image_scl, color, texture, shape,
size, position, motion, video_scl, visual_sprite, transition, and camera_motion
elements, and multiple key_frame elements-->
<!ELEMENT vid_obj_visual_features (image_scl?, color?, texture?, shape?, size?,
position?, motion?, video_scl?, visual_sprite?, transition?, camera_motion?,
key_frame*)>
```

In the above example, the first declaration indicates that a video object set element (<video_object_set>) 924 contains one or more video objects (<video_object>) 930. The second declaration indicates that a video object 930 contains an optional video object media feature (<vid_obj_media_features>) 936, semantic feature (<vid_obj_semantic_features>) 940, visual feature (<vid_obj_visual_features>) 938, and temporal feature (<vid_obj_temporal_features>) 937 elements. In addition, the video object tag is defined as having one required attribute, type, that can only have three possible values (LOCAL, SEGMENT, GLOBAL); and three optional attributes, id, object_ref, and object_node_ref, of type ID, IDREFS, and IDREFS, respectively.

Some XML tags include attributes. Attributes are intended for extra information associated with an element (like an ID). The last four declarations in the example shown above corresponds to the video object media feature 936, semantic feature 940, visual feature 938, and temporal feature 937 elements. These elements group feature elements depending on the information they provide. For example, the media features element (<vid_obj_media_features>) 936 contains an optional location, file_format, file_size, resolution, modality_transcoding, and bit_rate element to define the descriptors of the media features 936. The semantic feature element (<vid_obj_semantic_features>) contains an optional text annotation and the 6-W elements corresponding to the semantic feature descriptors 940. The visual feature element (<vid_obj_visual_features>) contains optional image_scl, color, texture, shape, size, position, video_scl, visual_sprite, transition, camera_motion elements, and multiple key_frame elements for the visual feature descriptors. The temporal features element (<vid_obj_temporal_features>) contains an optional time element as the temporal feature descriptor.

In the exemplary DTD listed in Appendix A, for the sake of clarity and flexibility feature elements are declared in external DTDs using entities. The following description sets forth a preferred method of referencing a separate external DTD for each one of these elements.

In the simplest case, DTDs include all the tags used in a document. This technique becomes unwieldy with longer documents. Furthermore, it may be desirable to use different parts of a DTD in many different places. External DTDs enable large DTDs to be built from smaller ones. That is, one DTD may link to another and in so doing pull in the elements and entities declared in the first. Smaller DTD's are easier to analyze. DTDs are connected with external parameter references, as illustrated in the example following:

```
<!ENTITY % camera_motion PUBLIC
"http://www.ee.columbia.edu/mpeg7/xml/features/camera_motion.dtd">
%camera_motion;
```

The object hierarchy can be defined in the image DTD. The following example provides an overview of a declaration for the present object hierarchy element.

```
<!-- Object hierarchy element -->
<!-- A hierarchy element consists of one root node -->
<!ELEMENT object_hierarchy (object_node)>
<!-- The object hierarchy element has two optional attributes: an id and
a type -->
<!ATTLIST object_hierarchy
    id ID #IMPLIED
    type CDATA #IMPLIED>
<!-- Object node element -->
<!-- Object node elements consist of zero or more object node
elements -->
<!ELEMENT object_node (object_node*)>
<!-- Object node elements must have an id attribute of type ID. -->
<!ATTLIST object_node
    id ID #IMPLIED
    object_ref IDREF #REQUIRED>
```

The object hierarchy element (<object_hierarchy>) preferably contains a single root object node element (<object_node>). An object node element generally contains zero or more object node elements. Each object node element can have an associated unique identifier, id. The identifier is expressed as an optional attribute of the elements of type ID, e.g. <object_node id="on1" object_ref="o1">. Each object node element can also include a reference to a video object element by using the unique identifier associated with each video object. The reference to the video object element is given as an attribute of type IDREF (object_ref). Object elements can link back to those object node elements pointing at them by using an attribute of type IDREFS (object_node_ref).

The entity relation graph definition is very similar to the object hierarchy's one. An example, is listed below.

```
<!-- Entity relation graph element -->
<!-- A entity relation graph element consists of zero or more entity relation elements -->
<!ELEMENT entity_relation_graph (entity_relation+)>
<!-- A entity relation graph element can include two attributes: an id and a type -->
<!-- Possible types of entity relation graphs and entity relations follow:
    - Spatial: topological. directional
    - Temporal: topological. directional
    - Semantic -->
<!ATTLIST entity_relation_graph
    id ID #IMPLIED
    type CDATA #IMPLIED>
<!-- Entity relation element -->
<!-- A entity relation graph element consists of one relation, and zero or more entity
nodes or entity relation elements -->
<!ELEMENT entity_relation (relation, (entity_node | entity_node_set |
entity_relation)*)>
<!-- A entity relation element can include a type attribute -->
<!ATTLIST entity_relation
    type CDATA #IMPLIED>
```

```
<!-- Entity relation element -->
<!-- Examples of relations are
    - SPATIAL.TOPOLOGICAL: overlap, etc.
    - SPATIAL.DIRECTIONAL: to the left, to the right, etc.
    - TEMPORAL.TOPOLOGICAL: at the same time, etc.
    - TEMPORAL.DIRECTIONAL: before, after, immediately before, etc.
    - SEMANTIC: father of, etc. -->
<!ELEMENT relation (#PCDATA | code)*>
<!-- Entity node element -->
<!-- This element can contain string data. It can have a unique attribute (id), and
must include a reference attribute to an object element (object_ref) -->
<!ELEMENT entity_node (#PCDATA)>
<!ATTLIST entity_node
    id ID #IMPLIED
    object_ref IDREF #REQUIRED>
<!-- Entity node set element -->
<!ELEMENT entity_node_set (entity_node+)>
```

The declaration of the entity node element can contain either one or another element by separating the child elements with a vertical bar rather than a comma.

The description above sets forth a data structure of a video description scheme, as well as systems and methods of characterizing video content in accordance with the present video description scheme. Of course, the present video description scheme can be used advantageously in connection with the systems described in connection with FIGS. 7 and 8.

Although the present invention has been described in connection with specific exemplary embodiments, it should be understood that various changes, substitutions and alterations can be made to the disclosed embodiments without departing from the spirit and scope of the invention as set forth in the appended claims.

The invention claimed is:

1. A non-transitory computer readable media containing digital information with at least one description record representing video content embedded within corresponding video information, the at least one description record generated by the method comprising:
    generating one or more video object descriptions from said video information using video object extraction processing;
    generating one or more video object hierarchy descriptions from said generated video object descriptions using object hierarchy construction and extraction processing, each video object hierarchy description describing at least one relationship between at least two objects in the video information; and
    generating one or more entity relation graph descriptions from said generated video object descriptions using entity relation graph generation processing, wherein said one or more generated entity relation graph descriptions describes non-hierarchical relationships between said objects associated with said one or more generated video object descriptions.

2. The computer readable media of claim 1, wherein said video object descriptions, said video object hierarchy descriptions, and said entity relation graph descriptions further comprise one or more feature descriptions.

3. The computer readable media of claim 2, wherein said one or more feature descriptions are selected from the group consisting of media features, visual features, temporal features and semantic features.

4. The computer readable media of claim 3, wherein said semantic features are further defined by at least one feature description selected from the group consisting of who, what object, what action, where, when, why and text annotation.

5. The computer readable media of claim 3, wherein said visual features are further defined by at least one feature description selected from the group consisting of color, texture, position, size, shape, motion, camera motion, editing effect and orientation.

6. The computer readable media of claim 3, wherein said media features are further defined by at least one feature description selected from the group consisting of file format, file size, color representation, resolution, data file location, author, creation, scalable layer and modality transcoding.

7. The computer readable media of claim 3, wherein said temporal features are further defined by at least one feature description selected from the group consisting of start time, end time and duration.

8. The computer readable media of claim 1, wherein said object hierarchy descriptions are based on visual feature relationships of video objects represented by said video object descriptions.

9. The computer readable media of claim 1, wherein said video object hierarchy descriptions are based on semantic feature relationships of video objects represented by said video object descriptions.

10. The computer readable media of claim 1, wherein said video object hierarchy descriptions are based on media feature relationships of video objects represented by said video object descriptions.

11. The computer readable media of claim 1, wherein said video object hierarchy descriptions are based on temporal feature relationships of video objects represented by said video object descriptions.

12. The computer readable media of claim 1, wherein said video object hierarchy descriptions are based on relationships of video objects represented by said video object descriptions, wherein said video object hierarchy descriptions have a plurality of hierarchal levels.

13. The computer readable media of claim 12, wherein said video object hierarchy descriptions having a plurality of hierarchal levels comprise clustering hierarchies.

14. The computer readable media of claim 13, wherein said clustering hierarchies are based on relationships of video objects represented by said video object descriptions, wherein said relationships are selected from a group consisting of visual feature relationships, semantic feature relationships, temporal feature relationships and media feature relationships.

15. The computer readable media of claim 14, wherein said video object hierarchy descriptions having a plurality of hierarchical levels are configured to comprise multiple levels of abstraction hierarchies.

16. The computer readable media of claim 15, wherein said multiple levels of abstraction hierarchies are configured to be based on relationships of video objects represented by said video object descriptions, wherein said relationships are selected from a group consisting of visual feature relationships, semantic feature relationships, temporal feature relationships and media feature relationships.

17. The computer readable media of claim 1, wherein said entity relation graph descriptions are based on relationships of video objects represented by said video object descriptions, wherein said relationships are selected from the group consisting of visual feature relationships, semantic feature relationships, temporal feature relationships and media feature relationships.

18. The computer readable media of claim 1, wherein said video object descriptions are in the form of encoded description information.

19. The computer readable media of claim 1, wherein said video object descriptions, said video object hierarchy descriptions, and said entity relation graph descriptions are combined together in the form of encoded description information.

20. The computer readable media of claim 19, wherein said encoded description information is in the form of binary encoded information.

21. The computer readable media of claim 19, wherein said encoded description information is in the form of XML encoded information.

22. The computer readable media of claim 1, wherein feature descriptions include pointers to extraction and matching code to facilitate code downloading.

23. The computer readable media of claim 5, wherein feature descriptions include pointers to extraction and matching code to facilitate code downloading.

* * * * *